United States Patent
Gu

(10) Patent No.: US 11,671,434 B2
(45) Date of Patent: Jun. 6, 2023

(54) ABNORMAL USER IDENTIFICATION

(71) Applicant: New H3C Security Technologies Co., Ltd., Anhui (CN)

(72) Inventor: Chengjie Gu, Beijing (CN)

(73) Assignee: New H3C Security Technologies Co., Ltd., Anhui (CN)

(*) Notice: Subject to any disclaimer, the term of this patent is extended or adjusted under 35 U.S.C. 154(b) by 129 days.

(21) Appl. No.: 17/049,563

(22) PCT Filed: May 9, 2019

(86) PCT No.: PCT/CN2019/086232
§ 371 (c)(1),
(2) Date: Oct. 21, 2020

(87) PCT Pub. No.: WO2019/218927
PCT Pub. Date: Nov. 21, 2019

(65) Prior Publication Data
US 2021/0240822 A1    Aug. 5, 2021

(30) Foreign Application Priority Data

May 14, 2018 (CN) .......................... 201810457994.8

(51) Int. Cl.
*H04L 9/40* (2022.01)
*G06F 21/55* (2013.01)
(Continued)

(52) U.S. Cl.
CPC .......... *H04L 63/1416* (2013.01); *G06F 18/00* (2023.01); *G06F 18/23213* (2023.01);
(Continued)

(58) Field of Classification Search
CPC ............. G06F 21/552; G06F 2221/034; G06F 18/24137; G06F 18/23213; G06F 18/00;
(Continued)

(56) References Cited

U.S. PATENT DOCUMENTS 10,505,959 B1 * 12/2019 Wang .................... G06N 20/00
2015/0127243 A1   5/2015 Jang
(Continued)

FOREIGN PATENT DOCUMENTS

CN       104239324 A    12/2014
CN       104268481 A    1/2015
(Continued)

OTHER PUBLICATIONS

Meng et al., Anomaly Detection Model of User Behavior Based on Principle Component Analysis. Journal of Ambient Intelligence and Humanized Computing, Jan. 21, 2016. p. 547-554 (Year: 2016).*
(Continued)

*Primary Examiner* — Carl G Colin
*Assistant Examiner* — Zhe Liu
(74) *Attorney, Agent, or Firm* — McDonnell Boehnen Hulbert & Berghoff LLP

(57) ABSTRACT

User behavior data of multiple users is acquired, and multiple user eigenvalues of user behavior data of each user under preset multiple user behavior dimensions are extracted. A user eigenvector of each user is determined based on the multiple eigenvalues of this user. Multiple user classes are obtained by clustering the user eigenvectors of multiple users are clustered through a preset clustering algorithm. A central vector of each user class is determined based on the user eigenvectors included in this user class. A difference eigenvector of each user class is determined, wherein a distance between the difference eigenvector and a central vector of an aggregation class to which the difference eigenvector belongs is not within a preset distance range. A user characterized by the difference eigenvector is determined as an abnormal user.

12 Claims, 5 Drawing Sheets

(51) Int. Cl.
*G06F 18/00* (2023.01)
*G06F 18/2433* (2023.01)
*G06F 18/23213* (2023.01)
*G06F 18/2413* (2023.01)

(52) U.S. Cl.
CPC .... *G06F 18/2433* (2023.01); *G06F 18/24137* (2023.01); *G06F 21/552* (2013.01); *G06F 2221/034* (2013.01); *H04L 63/1425* (2013.01)

(58) Field of Classification Search
CPC .... G06F 18/2433; G06K 9/62; G06K 9/6223; G06K 9/6272; G06K 9/6284; H04L 63/1425; H04L 63/1416
See application file for complete search history.

(56) References Cited

U.S. PATENT DOCUMENTS

| | | | |
|---|---|---|---|
| 2015/0235152 A1* | 8/2015 | Eldardiry | G06F 21/552 705/7.28 |
| 2016/0021141 A1* | 1/2016 | Liu | H04L 63/1425 726/23 |
| 2016/0335260 A1* | 11/2016 | Convertino | G06F 16/2358 |
| 2017/0171234 A1 | 6/2017 | Christian | |
| 2018/0060587 A1* | 3/2018 | Chen | G06F 21/552 |
| 2018/0114016 A1 | 4/2018 | Lee et al. | |
| 2018/0211270 A1* | 7/2018 | Wu | G06Q 30/0269 |
| 2018/0359270 A1* | 12/2018 | Chari | H04L 63/102 |
| 2018/0375781 A1* | 12/2018 | Chen | G06N 20/00 |
| 2018/0375886 A1* | 12/2018 | Kirti | H04L 63/1416 |
| 2019/0116193 A1* | 4/2019 | Wang | H04L 63/205 |
| 2019/0132224 A1* | 5/2019 | Verma | G06K 9/6267 |
| 2020/0228557 A1* | 7/2020 | Lin | G06N 5/047 |

FOREIGN PATENT DOCUMENTS

| | | |
|---|---|---|
| CN | 104537380 A | 4/2015 |
| CN | 105320702 A | 2/2016 |
| CN | 105553998 A | 5/2016 |
| CN | 105681089 A | 6/2016 |
| CN | 106649517 A | 5/2017 |
| CN | 107622072 A | 1/2018 |
| WO | 2016/054988 A1 | 4/2016 |
| WO | 2017022783 A1 | 2/2017 |
| WO | 2017200558 A1 | 11/2017 |

OTHER PUBLICATIONS

"How to interpret mean of Silhouette plot," In Stats StackExchange [online], Feb. 4, 2013 [retrieved on Jan. 28, 2023], Retrieved from the Internet: <URL: https://stats.stackexchange.com/questions/10540/how-to-interpret-mean-of-silhouette-plot/44653> (Year: 2013).*

Halkidi et al. "Clustering validity assessment: finding the optimal partitioning of a dataset." Proceedings 2001 IEEE International Conference on Data Mining. 2001. p. 187-194. (Year: 2001).*

International Search Report dated Aug. 9, 2019, issued in connection with International Application No. PCT/CN2019/086232, filed on May 9, 2019, 4 pages.

Written Opinion dated Aug. 9, 2019, issued in connection with International Application No. PCT/CN2019/086232, filed on May 9, 2019, 3 pages.

Takeshi et al., "Computer Network Security", First Edition, pp. 26-30 (2015).

Nagahashi, "Machine Learning Using R", First Edition, pp. 106-107 (2017).

* cited by examiner

ABNORMAL USER IDENTIFICATION

CROSS-REFERENCE TO RELATED APPLICATIONS

The present application is a U.S. National Phase Application under 35 U.S.C. § 371 of International Application No. PCT/CN2019/086232 filed May 9, 2019, which claims the priority to a Chinese Patent Application No. 201810457994.8, filed with the China National Intellectual Property Administration on May 14, 2018 and entitled "Abnormal User Identification Method and Apparatus", the disclosures of each of which are incorporated herein by reference in their entirety.

BACKGROUND

In order to ensure that hardware, software and data in a network system are better protected and a network system operates continuously and reliably, it is normally required to install a security device at the edge routers connecting the Intranet and the Extranet. In order to ensure the security of the network system, the security device screens and filters the messages sent from the Intranet or received from the Extranet.

At present, due to the unpredictability of user behavior, the detection of abnormal users becomes complex. For example, different detections are performed for the users at different periods and locations. In one scenario, a user frequently sends and receives e-mails, opens illegal web pages, downloads illegal videos, and so on.

For the detection of the above users, we need to detect the users who send and receive e-mails frequently, the users who open illegal web pages frequently, and the users who download illegal videos frequently and so on.

DETAILED DESCRIPTION

The technical solutions in the examples of the present disclosure will be described clearly and completely below with reference to the accompanying drawings in the examples of the present disclosure. Obviously, the described examples are only some of the examples of the present disclosure, rather than all of the examples. All other examples obtained based on the examples of the present disclosure by those skilled in the art without any creative work fall into the protection scope defined by the present disclosure.

At present, the identification of abnormal users in Intranet can be performed by blacklisting. Specifically, user names that are required to be restricted are added into a blacklist by an administrator. However, through the aforementioned blacklisting, only abnormal users that are known to the administrator can be identified. The aforementioned blacklisting cannot identify users who are unknown to the administrator and whose abnormal behavior cannot be found by the administrator.

To address the above problems, an example of the present disclosure provides an abnormal user identification method. The abnormal user identification method is applicable to electronic devices, such as servers, computers, mobile phones, security devices. For illustration, the following is described with an electronic device as an executor.

Figure 1:
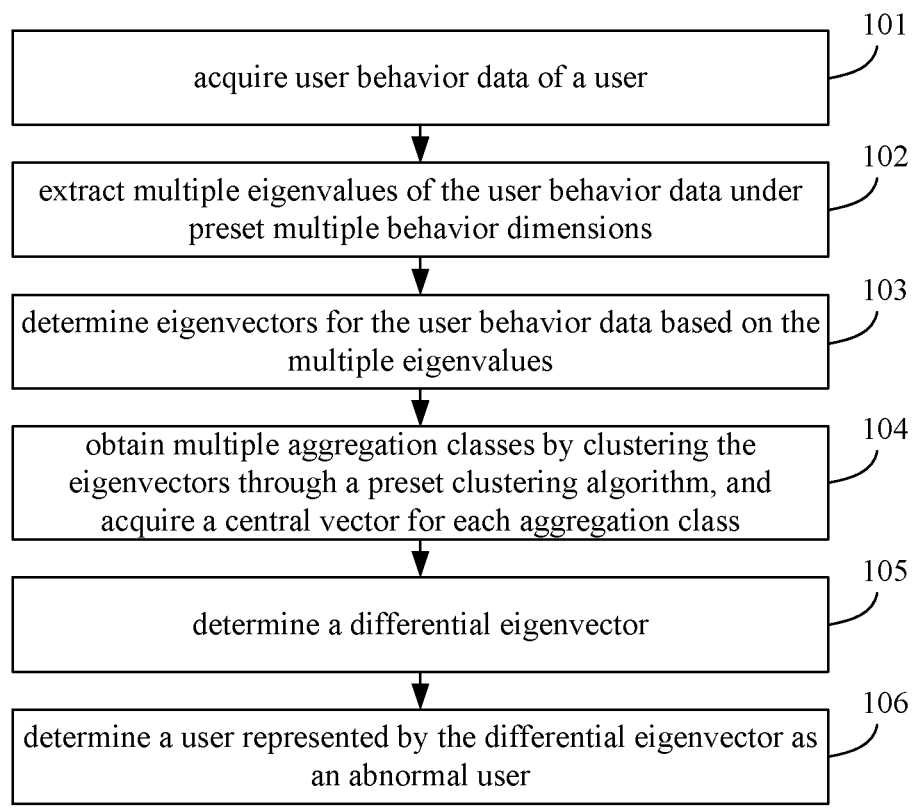
FIG. 1 is a flowchart of an abnormal user identification method according to an example of the present disclosure.

Specifically, with reference to FIG. 1, a flowchart of an abnormal user identification method according to an example of the present disclosure is illustrated. The abnormal user identification method according to an example of the present disclosure includes the following blocks 101-106.

At block 101, the electronic device acquires user behavior data of a user.

In the example of the present disclosure, the electronic device may acquire user behavior data of multiple users or multiple pieces of user behavior data of one user. If the electronic device acquires multiple pieces of user behavior data of one user, the multiple pieces of user behavior data include at least one piece of historical user behavior data and one piece of current user behavior data.

In an example of the present disclosure, in order to detect abnormal users, the electronic device acquires user behavior data of a user.

The electronic device may acquire user behavior data of a user from a user behavior log. Here, the user behavior log is to record various network behaviors of a user. In addition, the electronic device may also acquire user behavior data of a user from user-input user behavior data. The way of the electronic device acquiring user behavior data is not limited in the example of the present disclosure.

In one example, the electronic device may set different time granularities according to various requirements on abnormal user identification. The electronic device acquires user behavior data of a user within a preset time granularity.

At block 102, the electronic device extracts multiple eigenvalues of the user behavior data under preset multiple behavior dimensions.

Specifically, in order to facilitate the electronic device to extract eigenvalues of user behavior data under multiple behavior dimensions, the behavior dimensions may be divided into a business layer feature dimension and a behavior layer feature dimension. Through the business layer feature dimension and the behavior layer feature dimension, the electronic device may quickly extract eigenvalues under multiple behavior dimensions.

Figure 3:
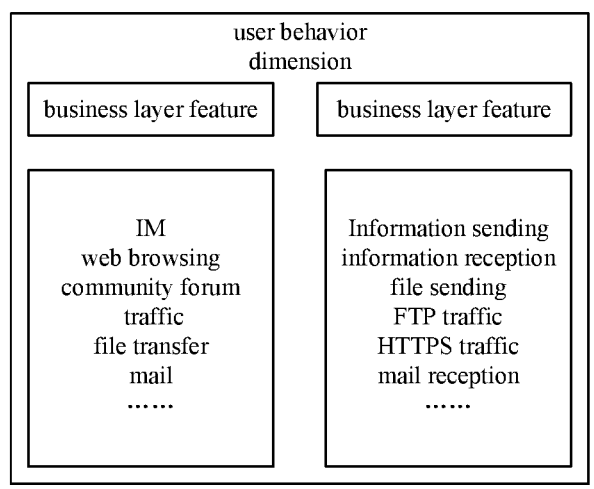
FIG. 3 is a schematic diagram of a feature system according to an example of the present disclosure.

The behavioral dimension is shown in FIG. 3. Wherein, the business layer feature dimension may include Instant Messaging (IM), web browsing, community forums, traffic, file transfer and email, and so on. The behavior layer feature dimension may include information sending, information reception, file sending, File Transfer Protocol (FTP) traffic, Hyper Text Transfer Protocol over Secure Socket Layer (HTTPS) traffic and email reception and so on.

The electronic device obtains multiple behavior dimensions by arbitrarily combining the content included in the two feature dimensions mentioned above. As shown in FIG. 3, in one example, the behavior dimensions obtained by the electronic device include, but are not limited to, the number of messages sent by IM, the number of messages received by IM, the number of files sent by IM, the size of files sent by IM, and so on.

Then, the electronic device extracts multiple eigenvalues under multiple behavior dimensions.

At block 103, the electronic device determines eigenvectors for the user behavior data based on the multiple eigenvalues.

Take one piece of user behavior data as an example. The electronic device obtains an eigenvector for this user behavior data by combining multiple eigenvalues for the user behavior data.

At block 104, the electronic device obtains multiple aggregation classes by clustering the eigenvectors through a preset clustering algorithm, and a central vector of each of aggregation classes is acquired.

In the example of the present disclosure, the preset clustering algorithm may be K-means clustering algorithm, K-means Plus clustering algorithm, and so on. The electronic device clusters the eigenvectors through a preset clustering algorithm to obtain multiple aggregation classes. Each aggregation class includes at least one eigenvector.

Take one aggregation class as an example. The electronic device calculates the mean value of multiple eigenvectors included in this aggregation class, and takes this mean value as the central vector of this aggregation class.

At block 105, the electronic device determines a difference eigenvector, wherein a distance between the difference eigenvector and a central vector of an aggregation class to which the difference eigenvector belongs is not within a preset distance range.

In an example of the present disclosure, the preset distance range is pre-stored in the electronic device.

Specifically, if the distance between the difference eigenvector and the central vector of the aggregation class to which the difference eigenvector belongs is not within a preset distance range, it is indicated that the distance between the eigenvector of the aggregation class and the central vector of the aggregation class is less than the minimum value of or larger than the maximum value of the preset distance range.

It can be understood that, when the distance between the eigenvector and the central vector of the aggregation class is less than the minimum value of or larger than the maximum value of the preset distance range, the electronic device determines the eigenvector as the difference eigenvector.

Take one aggregation class as an example. The electronic device calculates the distance between each eigenvector included in this aggregation class and the central vector of this aggregation class. After obtaining multiple distances, the electronic device sorts the distances. The electronic device obtains a distance that is not within the preset distance range, and takes an eigenvector characterized by the obtained distance as the difference eigenvector.

At block 106, the electronic device determines a user characterized by the difference eigenvector as an abnormal user.

For example, the electronic device obtains multiple eigenvalues of user behavior data $P_1$ of a user $Q_1$ under preset multiple behavior dimensions, and determines an eigenvector 111 for user behavior data $P_1$ based on the obtained multiple eigenvalues. If the electronic device determines the eigenvector 111 as a difference eigenvector, the electronic device determines the user $Q_1$ as the abnormal user.

In the abnormal user identification method according to the example of the present disclosure, the electronic device acquires a difference eigenvector whose distance from the central vector of the aggregation class is not within a preset distance range by clustering eigenvectors. The electronic device realizes the identification of abnormal users based on the acquired difference eigenvector. It is not necessary to add restricted user names to a blacklist by the administrator and it is not necessary to establish a blacklist by the electronic device to identify abnormal users, realizing the identification of users who are unknown to the administrator and whose abnormal behaviors cannot be found by the administrator.

Figure 2:
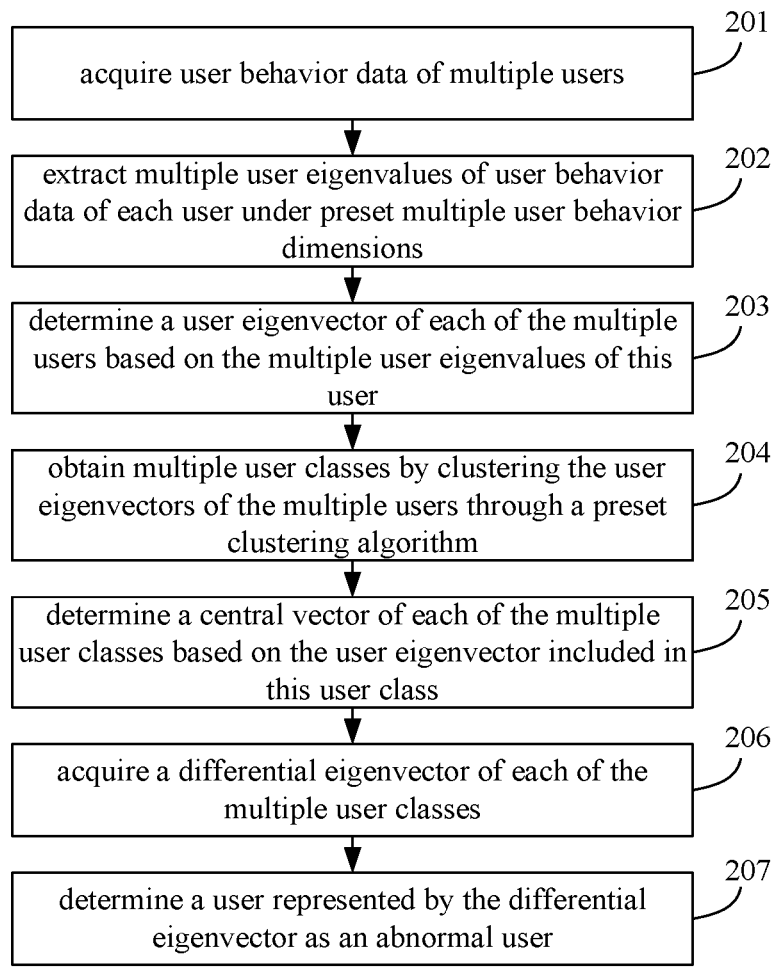
FIG. 2 is a flowchart of another abnormal user identification method according to an example of the present disclosure.

In one implementation, user behavior data acquired by an electronic device is user behavior data of multiple users. An example of the present disclosure provides an abnormal user identification method. With reference to FIG. 2, a flowchart of another abnormal user identification method according to an example of the present disclosure is illustrated. The method includes the following blocks 201-207.

At block 201, the electronic device acquires user behavior data of multiple users.

In an example of the present disclosure, in order to detect abnormal users, the electronic device acquires user behavior data of multiple users.

The electronic device may acquire user behavior data of multiple users from a user behavior log. Here, the user behavior log is to record various network behaviors of users. In addition, the electronic device may also acquire user behavior data of multiple users from user-input user behavior data. The way of the electronic device acquiring user behavior data is not limited in the example of the present disclosure.

In an example of the present disclosure, the electronic device may acquire user behavior data of different users according to a preset time granularity. The electronic device may set different time granularities according to various requirements on abnormal user identification.

For example, when identifying users with advanced persistent threat (APT) for long-term operations and planning, the electronic device may preset a larger time granularity. For example, the time granularity preset by the electronic device may be one week, one month, and so on.

For example, when identifying users who suddenly perform attacking behaviors before leaving their jobs, the electronic device may preset a smaller time granularity. For example, the time granularity preset by the electronic device may be 10 minutes, 1 hour, 24 hours, and so on.

Within the preset time granularity, the electronic device acquires user behavior data of multiple users.

In one example, assume that the current time is 10:00, the time granularity preset by the electronic device is 10 minutes, and the users to be identified include A, B and C. During the period from 10:00 to 10:10, the electronic device may obtain user behavior data 11 of user A, user behavior data 12 of user B and user behavior data 13 of user C. During the period from 9:50 to 10:00, the electronic device may also obtain user behavior data 21 of user A, user behavior data 22 of user B and user behavior data 23 of user C.

At block 202: the electronic device extracts multiple user eigenvalues of user behavior data of each user under preset multiple user behavior dimensions.

Specifically, in order to facilitate the electronic device to extract user eigenvalues of user behavior data of each user under multiple user behavior dimensions, the user behavior dimensions may be divided into the business layer feature dimension and the behavior layer feature dimension. Through the business layer feature dimension and the behavior layer feature dimension, the electronic device can quickly extract user eigenvalues under multiple user behavior dimensions.

The user behavioral dimension is shown in FIG. 3. The business layer feature dimension may include IM, web browsing, community forums, traffic, file transfer and email, and so on. The behavior level feature dimension may include information sending, information reception, file sending, File Transfer Protocol (FTP) traffic, HTTPS traffic and email reception and so on.

The electronic device may obtain multiple user behavior dimensions by arbitrarily combining the content of the two feature dimensions mentioned above. As shown in FIG. 3, in one example, the user behavior dimensions obtained by the electronic device include, but are not limited to, the number of messages sent by IM, the number of messages received by IM, the number of files sent by IM, the size of files sent by IM, and so on.

Then, under the multiple user behavior dimensions, the electronic device extracts the multiple user eigenvalues of each of the multiple users.

At block 203, the electronic device determines a user eigenvector for each of the multiple users based on the multiple user eigenvalues of this user.

Take one user as an example. The electronic device obtains the user eigenvector of the user by combines multiple user eigenvalues of this user.

Specifically, according to the example of the preceding operation, the electronic device obtains user behavior data 11 of user A, user behavior data 12 of user B and user behavior data 13 of user C.

The electronic device extracts, from the user behavior data 11, the number of messages sent by IM which is 10, the number of messages received by IM which is 8, the number of files sent by IM which is 2, and the size of files sent by IM which is 500 KB.

The electronic device extracts, from the user behavior data 12, the number of messages sent by IM which is 9, the number of messages received by IM which is 8, the number of files sent by IM which is 3, and the size of files sent by IM which is 490 KB.

The electronic device extracts, from the user behavior data 13, the number of messages sent by IM which is 10, the number of messages received by IM which is 7, the number of files sent by IM which is 1, and the size of files sent by IM which is 600 KB.

In this case, the electronic device may determine that the user eigenvector 01 for user A is {10, 8, 2, 500}, the user eigenvector 02 for user B is {9, 8, 3, 490} and the user eigenvector 03 for user C {10, 7, 1, 600}.

At block 204, the electronic device obtains multiple user classes by clustering the user eigenvectors of the multiple users through a preset clustering algorithm.

In the example of the present disclosure, the preset clustering algorithm may be K-means clustering algorithm, K-means Plus clustering algorithm, and so on. The electronic device clusters the user eigenvectors by a preset clustering algorithm to obtain multiple user classes. Each user class includes at least one user eigenvector.

In one example, the preset clustering algorithm is a K-means clustering algorithm. The electronic device obtains K initial user classes by clustering user eigenvectors of multiple users by the K-means clustering algorithm. K is a positive integer. The electronic device takes these K initial user classes as K user classes.

At block 205, the electronic device determines a central vector of each of the multiple user classes based on the user eigenvector included in this user class.

Take one user class as an example. The electronic device calculates a mean value of multiple user eigenvectors included in this user class, and takes this mean value as the central vector of this user class.

According to the example of the preceding operations, the electronic device obtains multiple user classes by clustering the user eigenvectors. Assume that multiple user classes include user class 1, and user class 1 includes user eigenvector 01 of user A, user eigenvector 02 of user B and user eigenvector 03 of user C.

The electronic device calculates a mean value $t_1$ of user eigenvectors 01, 02 and 03, and determines the mean value $t_1$ as the central vector of user class 1.

At block 206, the electronic device acquires a difference eigenvector of each of the multiple user classes.

In an example of the present disclosure, the difference eigenvector is a user eigenvector whose distance from the central vector of the user class is not within a preset distance range, that is, the distance between the difference eigenvector and the central vector of the user class to which the difference eigenvector belongs is not within the preset distance range. The preset distance range is pre-stored in an electronic device.

Specifically, if the distance from the central vector of the user class is not within a preset distance range, it is indicated that the distance between a user eigenvector of a user class and the central vector of the user class is less than the minimum value of or larger than the maximum value of the preset distance range.

It can be understood that, when the distance between a user eigenvector of a user class and the central vector of the user class is less than the minimum value of or larger than the maximum value of the preset distance range, the electronic device determines the user eigenvector as the difference eigenvector.

Take one user class as an example. The electronic device calculates the distance between each user eigenvector included in this user class and the central vector of this user class. After obtaining multiple distances, the electronic device sorts the distances. The electronic device obtains a distance that is not within the preset distance range, and takes a user eigenvector characterized by the obtained distance as the difference eigenvector.

According to the example of the preceding operations, assume that the preset distance range is d1~d2. The user class 1 includes user eigenvector 01 of user A, user eigenvector 02 of user B and user eigenvector 03 of user C. The central vector of the user class 1 is $t_1$. The distance between the user eigenvector 01 and the central vector $t_1$ is $d_{01}$, the distance between the user eigenvector 02 and the central vector $t_1$ is $d_{02}$, and the distance between the user eigenvector 03 and the central vector $t_1$ is $d_{03}$. If $d_{01}<d_1$, $d_1<d_{02}<d_2$, $d_1<d_{03}<d_2$, the electronic device determines the user eigenvector 01 characterized by $d_{01}$ as the difference eigenvector.

For different user classes, the distribution of user eigenvectors is different. In an example of the present disclosure, in order to improve the accuracy that an electronic device acquires a difference eigenvector, the electronic device may store the preset distance range for each user class.

At block 207, the electronic device determines a user characterized by the difference eigenvector as an abnormal user.

Specifically, according to the example of the preceding operations, the electronic device determines the user eigenvector 01 as the difference eigenvector, then determines the user characterized by the user eigenvector 01 as an abnormal user, that is, determines user A as an abnormal user.

Therefore, in the technical solution according to the example of the present disclosure, the electronic device obtains a difference eigenvector in a user class by clustering the user eigenvectors. The electronic device realizes the identification of abnormal users based on the difference eigenvector. An administrator does not need to add restricted user names to a blacklist, and an electronic device does not need to establish a blacklist to identify abnormal users. The abnormal user identification method according to the example of the present disclosure can identify abnormal users who are unknown to the administrator and whose abnormal behavior cannot be found by the administrator.

In one implementation, in order to avoid that too few user eigenvectors being included in a user class leads to an undesired clustering effect and inaccurate abnormal user identification, the electronic device stores a preset number threshold, which is used to limit the number of user eigenvectors included in a user class. The block 204 may include the following operations.

The electronic device obtains K initial user classes by clustering user eigenvectors of multiple users by the K-means clustering algorithm.

The electronic device detects whether the K initial user classes include an initial user class in which the number of user eigenvectors is less than a number threshold. If not, the electronic device takes these K initial user classes as K user classes.

If yes, the electronic device acquires a first initial user class and a second initial user class in the K initial user classes.

In an example of the present disclosure, the first initial user class is an initial user class, in the K initial user classes, in which the number of user eigenvectors is less than a number threshold. The second initial user class is an initial user class in the K initial user classes, wherein the distance between a central vector of this initial user class and the central vector of the first initial user class is minimum.

Then, the electronic device obtains a combined initial user class by combining the first initial user class and the second initial user class.

The electronic device takes the combined initial user class as a clustered user class, and takes other initial user classes that are not combined in the K initial user classes as clustered user classes. Thus, the electronic device obtains multiple user classes.

For example, the preset number threshold is 10. The electronic device clusters user eigenvectors of multiple users by the K-means clustering algorithm to obtain five initial user classes, e.g., initial user class 1, initial user class 2, initial user class 3, initial user class 4 and initial user class 5. The initial user class 1 includes 8 user eigenvectors, the initial user class 2 includes 12 user eigenvectors, the initial user class 3 includes 11 user eigenvectors, the initial user class 4 includes 15 user eigenvectors, and the initial user class 5 includes 17 user eigenvectors.

As can be seen, 8<10, that is, the number of user eigenvectors included in the initial user class 1 is less than the number threshold. Thus, the initial user class 1 is the first initial user class.

The distance between the central vector of the initial user class 2 and the central vector of the initial user class 1 is calculated by the electronic device as $d_{11}$. The distance between the central vector of the initial user class 3 and the central vector of the initial user class 1 is calculated by the electronic device as $d_{12}$. The distance between the central vector of the initial user class 4 and the central vector of the initial user class 1 is calculated by the electronic device as $d_{13}$. The distance between the central vector of the initial user class 5 and the central vector of the initial user class 1 is calculated by the electronic device as $d_{14}$.

If $d_{11}<d_{12}<d_{13}<d_{14}$, $d_{11}$ is the smallest distance and $d_{11}$ corresponds to the initial user class 2, the electronic device may determine the initial user class 2 as the second initial user class. The electronic device combines the first initial user class 1 and the second initial user class 2 to obtain a combined initial user class 1.

The electronic device takes the combined initial user class 1 as a clustered user class 01, the initial user class 3 as a clustered user class 03, the initial user class 4 as a clustered user class 04, and the initial user class 5 as a clustered user class 05. Thus, the electronic device obtains four user classes.

In one implementation, in order to obtain a better clustering effect, after obtaining multiple user classes, the electronic device may combine the multiple user classes by calculating aggregate values of user eigenvectors. The aggregate value represents the reasonable degree that a user eigenvector belongs to a user class.

In an example, the electronic device may obtain the aggregate value by the following operations.

The electronic device calculates a first distance between the first user eigenvector and each second user eigenvector, respectively. The second user eigenvector is a user eigenvector included in a user class to which the first user eigenvector belongs except the first user eigenvector. The electronic device obtains a first distance mean value by taking the mean value of the multiple first distances.

The electronic device calculates a second distance between the first user eigenvector and each third user eigenvector, respectively. The third user eigenvector is a user eigenvector included in a user class except the user class to which the first user eigenvector belongs. The electronic device takes the mean value of multiple second distances for the same user class, to obtain multiple second distance mean values. The electronic device obtains the minimum distance mean value of the multiple second distance mean values.

Then, the electronic device calculates a ratio of the first distance mean value to the minimum distance mean value, and takes this ratio as the aggregate value of the first user eigenvector.

The above is illustrated with the first user eigenvector as an example only and is not restrictive.

Figure 4:
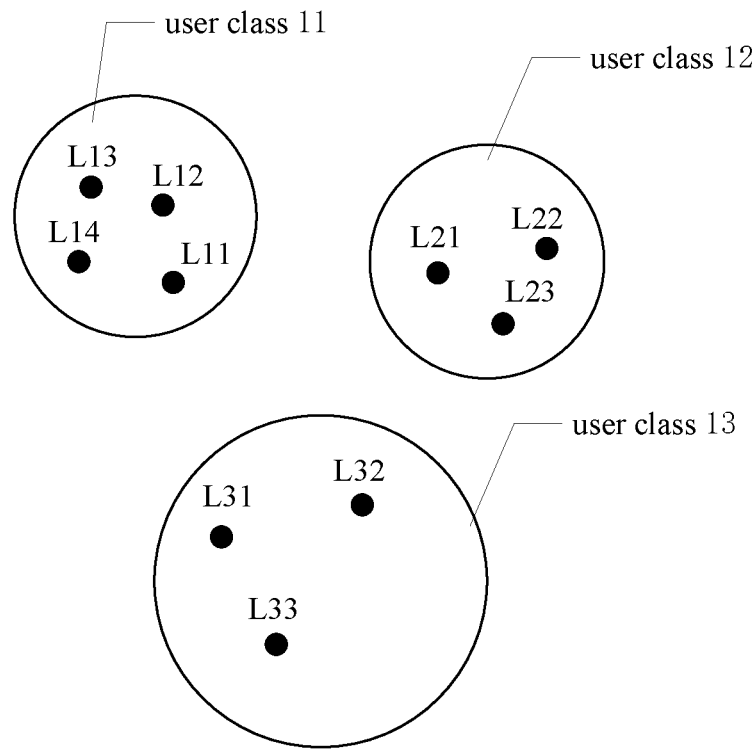
FIG. 4 shows a distribution map of user classes according to an example of the present disclosure.

For example, the distribution of user classes is as shown in FIG. 4. Each black dot in FIG. 4 represents a user eigenvector. User class 11, user class 12 and user class 13 are included in FIG. 4. Take user eigenvector $L_{11}$ included in the user class 11 as an example. In order to calculate the aggregate value, the electronic device calculates the first distance $d_{21}$ between $L_{11}$ and user eigenvector $L_{12}$ included in the user class 11, calculates the first distance $d_{22}$ between $L_{11}$ and user eigenvector $L_{13}$ included in the user class 11, and calculates the first distance $d_{23}$ between $L_{11}$ and user eigenvector $L_{14}$ included in the user class 11. The electronic device obtains a first distance mean value $D_1$ by calculating the mean value of $d_{21}$, $d_{22}$ and $d_{23}$.

The electronic device calculates the second distance $d_{24}$ between $L_{11}$ and user eigenvector $L_{21}$ included in the user class 12, calculates the second distance $d_{25}$ between $L_{11}$ and user eigenvector $L_{22}$ included in the user class 12, and calculates the second distance $d_{26}$ between $L_{11}$ and user eigenvector $L_{23}$ included in the user class 12. The electronic device obtains a second distance mean value $D_2$ by calculating the mean value of $d_{24}$, $d_{25}$ and $d_{26}$.

The electronic device calculates the second distance $d_{27}$ between $L_{11}$ and user eigenvector $L_{31}$ included in the user class 13, calculates the second distance $d_{28}$ between $L_{11}$ and user eigenvector $L_{32}$ included in the user class 13, and calculates the second distance $d_{29}$ between $L_{11}$ and user eigenvector $L_{33}$ included in the user class 13. The electronic device obtains a second distance mean value $D_3$ by calculating the mean value of $d_{27}$, $d_{28}$ and $d_{29}$.

If $D_2<D_3$, the electronic device calculates the ratio of $D_1$ to $D_2$, that is, $D_1/D_2$, and takes $D_1/D_2$ as the aggregate value $J_{11}$ of the user eigenvector $L_{11}$.

Similarly, the electronic device may calculate aggregate values of other user eigenvectors included in user class 11, and aggregate values of user eigenvectors included in user classes 12 and 13, which will not be repeated here.

In an example, based on the aggregate values determined above, the process of combining the obtained multiple user classes by the electronic device may include the following operations.

The electronic device calculates the distance between the central vectors of any two user classes of the multiple user classes, to obtain multiple distances.

The electronic device acquires the minimum distance from the obtained distances, and determines the first user class and the second user class characterized by the minimum distance.

The electronic device acquires a first aggregate value of a user eigenvector included in each of the multiple user classes. Here, the electronic device may obtain multiple first aggregate values.

In addition, when the electronic device takes the first user class and the second user class as a combined user class, that is, when the electronic device takes the first user class and the second user class as one user class, the electronic device acquires second aggregate values of user eigenvectors included in the combined user class, and acquires a second aggregate value of a user eigenvector included in each user class of the multiple user classes except the combined user class. Here, the electronic device may obtain multiple second aggregate values.

The electronic device obtains a first sum value by performing a summation operation on the multiple first aggregate values. The electronic device obtains a second sum value by performing a summation operation on the multiple second aggregate values. Here, the sum of the aggregate values of all user eigenvectors included in multiple user classes is to evaluate the clustering effect.

When the second sum value is less than the first sum value, the electronic device determines that combining the first user class and the second user class can achieve a better clustering effect, and thus combines the first user class and the second user class.

Then, the electronic device recalculates the distance between central vectors of any two user classes in the multiple user classes, determines two user classes characterized by the minimum distance in recalculated multiple distances, and combines the two user classes until the second sum value is not less than the first sum value.

FIG. 4 is still taken as an example. The electronic device obtains, through calculation, the distance $z_1$ between the central vector of the user class 11 and the central vector of the user class 12 is, the distance $z_2$ between the central vector of the user class 11 and the central vector of the user class 13, and the distance $z_3$ between the central vector of the user class 12 and the central vector of the user class 13. If $z_1<z_2<z_3$, $z_1$ is the smallest, the user class 11 characterized by $z_1$ is determined as the first user class, and the user class 12 characterized by $z_1$ as the second user class.

For the user class 11, the electronic device calculates the aggregate value $J_{11}$ of the user eigenvector $L_{11}$, the aggregate value $J_{12}$ of the user eigenvector $L_{12}$, the aggregate value $J_{13}$ of the user eigenvector $L_{13}$ and the aggregate value $J_{14}$ of the user eigenvector $L_{14}$. For the user class 12, the electronic device calculates the aggregate value $J_{21}$ of the user eigenvector $L_{21}$, the aggregate value $J_{22}$ of the user eigenvector $L_{22}$, the aggregate value $J_{23}$ of the user eigenvector $L_{23}$. For the user class 13, the electronic device calculates the aggregate value $J_{31}$ of the user eigenvector $L_{31}$, the aggregate value $J_{32}$ of the user eigenvector $L_{32}$, the aggregate value $J_{33}$ of the user eigenvector $L_{33}$.

In addition, the electronic device takes the user class 11 and the user class 12 as a combined user class 01. For the combined user class 01, the electronic device calculates the aggregate value $J_{01}$ of the user eigenvector $L_{11}$, the aggregate value $J_{02}$ of the user eigenvector $L_{12}$, the aggregate value $J_{03}$ of the user eigenvector $L_{13}$, the aggregate value $J_{04}$ of the user eigenvector $L_{14}$, the aggregate value $J_{05}$ of the user eigenvector $L_{21}$, the aggregate value $J_{06}$ of the user eigenvector $L_{22}$ and the aggregate value $J_{07}$ of the user eigenvector $L_{23}$. For the user class 13, the electronic device calculates the aggregate value $J_{31}$ of the user eigenvector $L_{08}$, the aggregate value $J_{32}$ of the user eigenvector $L_{09}$, and the aggregate value $J_{33}$ of the user eigenvector $L_{10}$.

The first sum value $M_1$ is calculated by the electronic device as $M_1=J_{11}+J_{12}+J_{13}+J_{14}+J_{21}+J_{22}+J_{23}+J_{31}+J_{32}+J_{33}$.

The second sum value $M_2$ is calculated by the electronic device as $M_2=J_{01}+J_{02}+J_{03}+J_{04}+J_{05}+J_{06}+J_{07}+J_{08}+J_{09}+J_{10}$.

If $M_2<M_1$, the electronic device combines the user class 11 and the user class 12 to obtain the combined user class 01. Otherwise, the electronic device does not combine the user class 11 and the user class 12.

In an example, in order to achieve a better clustering effect, the electronic device may also obtain aggregation values by the following operations.

For example, the process of determining the first distance mean value and the minimum distance mean value of the multiple second distance mean values by the electronic device is illustrated above. After calculating the ratio of the minimum distance mean value to the first distance mean value, the electronic device obtains the aggregation value of the first user eigenvector by subtracting 1 from this ratio.

The user eigenvector $L_{11}$ included in the user class 11 in FIG. 4 is taken as an example. The electronic device calculates $D_1$, $D_2$ and $D_3$, wherein, $D_2<D_3$. The electronic device calculates the ratio of $D_2$ to $D_1$, i.e., $D_2/D_1$. Then, the electronic device takes $(D_2/D_1-1)$ as the aggregate value $J_{11}$ of the user eigenvector $L_{11}$.

In an example, in order to achieve a better clustering effect, the electronic device may also obtain aggregation values by the following operations.

For example, the process of determining the first distance mean value and the minimum distance mean value of the multiple second distance mean values by the electronic device is illustrated above. After calculating the ratio of the first distance mean value to the minimum distance mean value, the electronic device obtains the aggregation value of the first user eigenvector by subtracting this ratio from 1.

The user eigenvector $L_{11}$ included in user class 11 in FIG. 4 is taken as an example. The electronic device calculates $D_1$, $D_2$ and $D_3$, wherein, $D_2<D_3$. The electronic device calculates the ratio of $D_1$ to $D_2$, i.e., $D_1/D_2$. Then, the electronic device takes $(1-D_1/D_2)$ as the aggregate value $J_{11}$ of the user eigenvector $L_{11}$.

In an example, based on the aggregation value obtained by subtracting the ratio from 1, or by subtracting 1 from the ratio, the process of combining the obtained multiple user classes by the electronic device may include the following operations.

The electronic device calculates the distance between the central vectors of any two user classes in the multiple user classes, to obtain multiple distances.

The electronic device acquires the minimum distance from the obtained distances, and determines the first user class and the second user class characterized by the minimum distance.

The electronic device acquires a first aggregate value of a user eigenvector included in each of the multiple user classes. Here, the electronic device may obtain multiple first aggregate values.

In addition, when the electronic device takes the first user class and the second user class as a combined user class, that is, when the electronic device takes the first user class and the second user class as one user class, the electronic device acquires second aggregate values of user eigenvectors included in the combined user class, and acquires a second aggregate value of a user eigenvector included in each user class in the multiple user classes except the combined user class. Here, the electronic device may obtain multiple second aggregate values.

The electronic device obtains a first sum value by performing a summation operation on the multiple first aggregate values. The electronic device obtains a second sum value by performing a summation operation on the multiple second aggregate values.

When the second sum value is larger than the first sum value, the electronic device determines that combining the first user class and the second user class can achieve a better clustering effect, and thus combines the first user class and the second user class.

Then, the electronic device recalculates the distance between central vectors of any two of the multiple user classes, determines two user classes characterized by the minimum distance in recalculated multiple distances, and combines the two user classes until the second sum value is not larger than the first sum value.

In one implementation L, in order to improve the speed of clustering, the electronic device may obtain a rough class of each user by performing rough classification on multiple users according to a user attribute of each of the multiple users. Take one rough class as an example. The electronic device obtains multiple user classes by clustering the multiple user eigenvectors included in this rough class by a preset clustering algorithm.

For example, the user attribute includes a position attribute. The position attribute includes an accountant, a cashier, human resources, customer service, development and design, and so on. Users are roughly classified based on the position attributes of the users. For example, users belonging to the finance department such as accountants and cashiers are divided into one rough class, users belonging to the personnel department such as human resources staffs are divided into one rough class, users belonging to the administration department such as customer service staffs are divided into one rough class, users belonging to the design department such as development and design staffs are divided into one rough class, and so on.

In the process of clustering, the electronic device clusters user eigenvectors of multiple users included in each of the four rough classes, i.e., the design department, finance department, administration department and personnel department by a preset clustering algorithm, to obtain multiple user classes.

In an example, in order to improve the accuracy of an electronic device acquiring difference eigenvectors, the distance range of each user class is pre-stored in the electronic device. The distance range is used to limit the distance between a user eigenvector included in a user class and the central vector of the user class.

In one implementation, the electronic device may determine the distance range by the following operations.

The electronic device calculates the distance between the central vector of user class X and each user eigenvector included in user class X, to obtain multiple distances. The user class X is any user class.

The electronic device calculates the distance mean value of multiple distances as a third distance mean value. The electronic device also calculates the standard deviation of multiple distances as a first standard deviation. The electronic device constructs a normal distribution curve based on the third distance mean value and the first standard deviation. The normal distribution curve is used to represent the distribution of the distances between the central vector of the user class X and the user eigenvectors included in the user class X.

Based on the normal distribution curve, a first boundary value and a second boundary value are determined by the electronic device based on the third distance mean value and the first standard deviation. The first boundary value is less than the third distance mean value, and the absolute value of the difference between the first boundary value and the third distance mean value is a preset multiple of the first standard deviation. The second boundary value is larger than the third distance mean value, and the absolute value of the difference between the second boundary value and the third distance mean value is also a preset multiple of the first standard deviation.

The electronic device determines the interval from the first boundary value to the second boundary value as the distance range of user class X.

Figure 5:
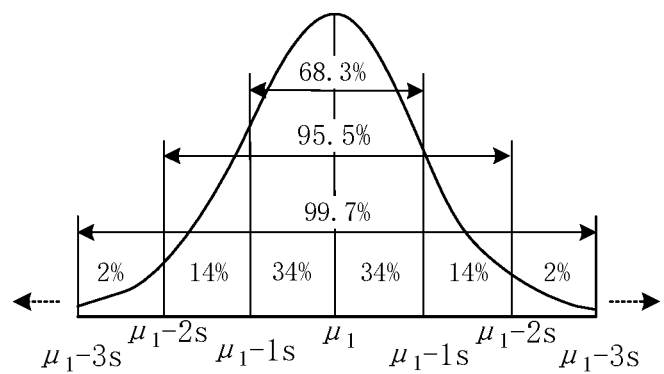
FIG. 5 is a schematic diagram of a normal distribution curve according to an example of the present disclosure.

In one example, the preset multiple is 3. In this case, the electronic device determines the distance range of the user class X based on three times the standard deviation as shown in FIG. 5. In FIG. 5, $\mu_1$ is the third distance mean value, s is the first standard deviation, and the distance range is $\mu_1-3s\sim\mu_1+3s$.

In the normal distribution curve, data whose distance from the third distance mean value $\mu_1$ is larger than three times the standard deviation belongs to a small probability event, which represents an event that cannot happen. For a user eigenvector included in the user class X, if the distance between the user eigenvector and the central vector of user the class X is not within the distance range, the electronic device may identify this user eigenvector as a difference eigenvector.

However, in practical applications, the distribution of distances between the central vector of a user class and user eigenvectors included in the user class does not conform to the normal distribution curve. In another implementation, the electronic device may determine the distance range by the following operations.

The electronic device calculates the distance between the central vector of the user class X and each user eigenvector included in the user class X.

The electronic device calculates a logarithm value of each of the multiple distances based on a preset logarithmic function. The electronic device also calculates the mean value of multiple logarithm values as a logarithmic mean value. The electronic device also calculates the standard deviation of multiple logarithm values as a second standard deviation. The electronic device constructs a normal distribution curve based on the logarithmic mean value and the second standard deviation. The normal distribution curve is used to represent the logarithmic distribution of the distances between the central vector of the user class X and the user eigenvectors included in the user class X.

Based on the normal distribution curve, a third boundary value and a fourth boundary value are determined by the electronic device based on the logarithmic mean value and the second standard deviation. The third boundary value is less than the logarithmic mean value, and the absolute value of the difference between the third boundary value and the logarithmic mean value is a preset multiple of the second standard deviation. The fourth boundary value is larger than the logarithmic mean value, and the absolute value of the difference between the second boundary value and the logarithmic mean value is also a preset multiple of the second standard deviation.

The electronic device calculates, based on the inverse function of the preset logarithmic function, the antilogarithm value of the third boundary value as a first antilogarithm value and the antilogarithm value of the fourth boundary value as a second antilogarithm value. For example, if the preset logarithmic function is $y=\log_{10}x$, the inverse function of the preset logarithmic function is $x=10^y$.

The electronic device determines an interval from the first antilogarithm value to the second antilogarithm value as the distance range of user class X.

In one implementation, in order to improve the accuracy of the electronic device determining abnormal users, the electronic device determines whether a user eigenvalue for a difference eigenvector exceeds a preset baseline eigenvalue based on each of the multiple user behavior dimensions. In one example, for each user behavioral dimension, there is one baseline eigenvalue preset by the electronic device.

If the user eigenvalue for the difference eigenvector exceeds the baseline eigenvalue, the electronic device may determine that the user behavior characterized under the user behavior dimension is an abnormal user behavior, and that the user characterized by the difference eigenvector is an abnormal user.

If the user eigenvalue for the difference eigenvector does not exceed the baseline eigenvalue, the electronic device determines that the user behavior characterized under the user behavior dimension is a normal user behavior. If all the user eigenvalues for the difference eigenvector do not exceed the baseline eigenvalue, the electronic device determines that the user characterized by the difference eigenvector is a normal user.

For example, the baseline eigenvalue for a user behavior dimension 1 is $X_1$, the baseline eigenvalue for a user behavior dimension 2 is $X_2$, and the baseline eigenvalue for a user behavior dimension 3 is $X_3$. The difference eigenvector includes a user eigenvalue 1 for the user behavior dimension 1, a user eigenvalue 2 for the user behavior dimension 2 and a user eigenvalue 3 for the user behavior dimension 3.

For the user behavior dimension 1, if the user eigenvalue 1 exceeds the baseline eigenvalue $X_1$, the electronic device may determine that the user behavior characterized under the user behavior dimension 1 is an abnormal user behavior, and the user characterized by the difference eigenvector is an abnormal user.

For the user behavior dimension 2, if the user eigenvalue 2 exceeds the baseline eigenvalue $X_2$, the electronic device may determine that the user behavior characterized under the user behavior dimension 2 is an abnormal user behavior, and the user characterized by the difference eigenvector is an abnormal user.

For the user behavior dimension 3, if the user eigenvalue 3 exceeds the baseline eigenvalue $X_3$, the electronic device may determine that the user behavior characterized under the user behavior dimension 3 is an abnormal user behavior, and the user characterized by the difference eigenvector is an abnormal user.

If the user eigenvalue 1 does not exceed the baseline eigenvalue $X_1$, the user eigenvalue 2 does not exceed the baseline eigenvalue $X_2$, and the user eigenvalue 3 does not exceed the baseline eigenvalue $X_3$, the electronic device may determine that the user characterized by the difference eigenvector is a normal user.

In an example of the present disclosure, for a user behavior dimension with a small difference in user eigenvalue, for example, the user behavior dimension 1, the electronic device may directly determine the baseline eigenvalue for the user behavior dimension 1.

For example, a frequency of a user switching MAC addresses is usually 1 or 2 times a day. In this case, the electronic device may determine that a baseline eigenvalue for a user behavior dimension, i.e., the frequency of switching MAC addresses, is 2.

For a user behavior dimension with a large difference in user eigenvalue, for example, the user behavior dimension 2, the probability density distribution of user eigenvalues for multiple pieces of user behavior data under user behavior dimension 2 is calculated by the electronic device. Based on the probability density distribution, the electronic device determines a baseline eigenvalue for the user behavior dimension 2.

Figure 6:
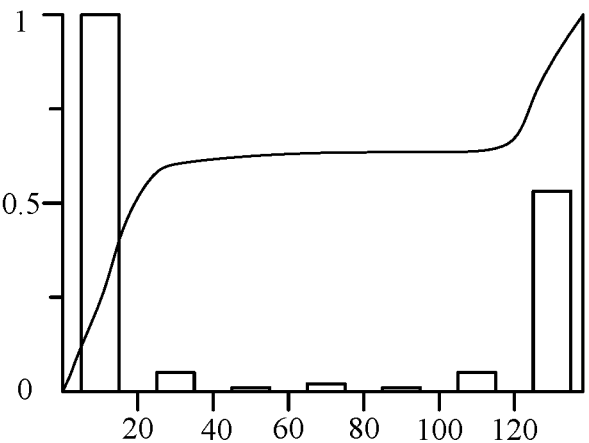
FIG. 6 is a schematic diagram of a cumulative probability curve according to an example of the present disclosure.

For example, the cumulative probability curve is shown in FIG. 6. In FIG. 6, the horizontal axis is the user eigenvalue and the vertical axis is the cumulative probability. The rectangle in the coordinate axes is the probability density of the user eigenvalue. The cumulative probability curve is obtained based on the probability density distribution. As can be seen from FIG. 6, the slope of the cumulative probability curve for user eigenvalues in the interval from 20 to 120 is much smaller than the average slope. In this case, the electronic device may determine that the baseline eigenvalue for the user behavior dimension characterized in FIG. 6 is less than 20 or greater than 120.

Figure 7:
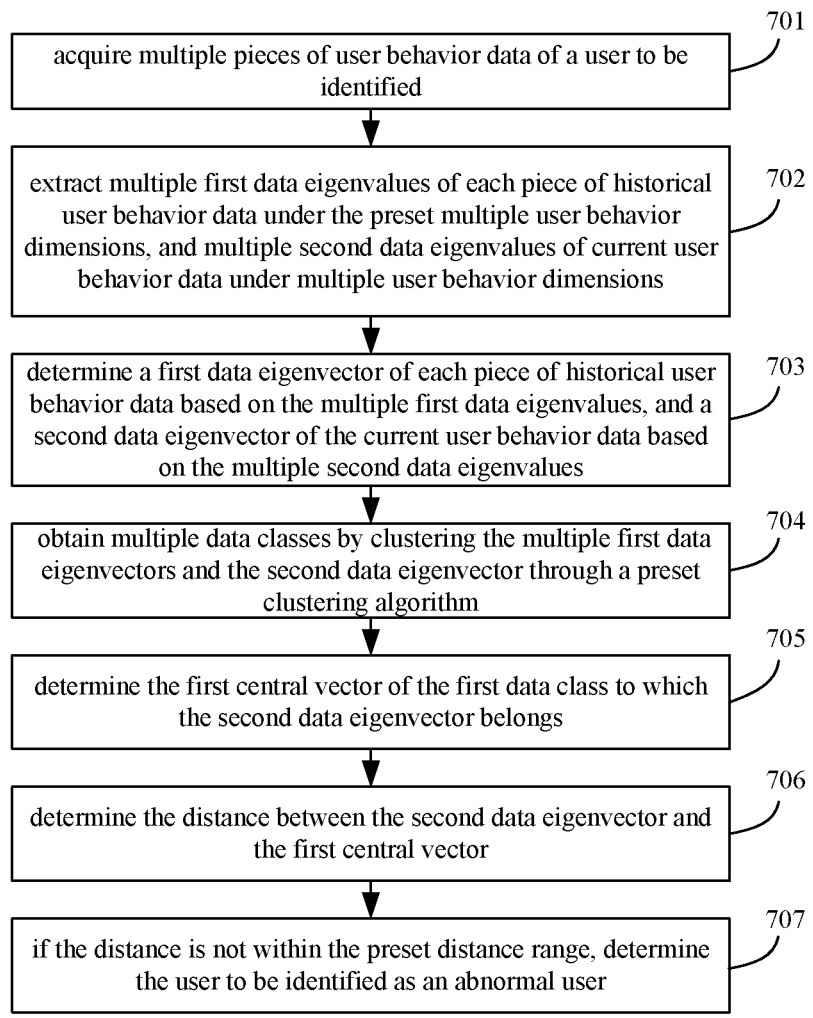
FIG. 7 is a flowchart of yet another abnormal user identification method according to an example of the present disclosure.

In one implementation, the multiple pieces of user behavior data acquired by the electronic device may also be multiple pieces of user behavior data of one user. An example of the present disclosure further provides an abnormal user identification method. With reference to FIG. 7, a flowchart of yet another abnormal user identification method according to an example of the present disclosure is illustrated. The method includes blocks 701-707.

At block 701, the electronic device acquires multiple pieces of user behavior data of a user to be identified. The multiple pieces of user behavior data include at least one piece of historical user behavior data and a piece of current user behavior data.

In an example of the present disclosure, in order to detect whether a user to be identified is an abnormal user, the electronic device acquires multiple pieces of user behavior data of the user to be identified. Here, a user to be identified is illustrated as an example only and is not restrictive.

The electronic device may acquire, from a user behavior log, multiple pieces of user behavior data of a user to be identified. Here, the user behavior log is to record various network behaviors of the user. In addition, the electronic device may also acquire, from user-input user behavior data, multiple pieces of user behavior data of a user to be identified. The way of the electronic device acquiring user behavior data is not limited in the example of the present disclosure.

In an example of the present disclosure, the electronic device may acquire user behavior data of different users according to a preset time granularity. The electronic device may set different time granularities according to various requirements on abnormal user identification.

The electronic device acquires multiple pieces of user behavior data of a user to be identified according to a preset time granularity.

In one example, assume that the current time is 10:00 and the user to be identified is user A1. The time granularity preset by an electronic device is 10 minutes. The electronic device may obtain user behavior data 31 of user A1 during the period from 9:50 to 10:00, user behavior data 32 of user A1 during the period from 9:40 to 9:50, user behavior data 33 of user A1 during the period from 9:30 to 9:40, and so on. The user behavior data 31 is the current user behavior data of user A1. The user behavior data 32 and user behavior data 33 are historical user behavior data of user A1.

In another example, assume that the current time is 10:00 and a user to be identified is user A1. The time granularity preset by an electronic device is 10 minutes. The electronic device may obtain user behavior data 41 of user A1 during the period from 10:00 to 10:10, user behavior data 42 of user A1 during the period from 9:50 to 10:00, user behavior data 43 of user A1 during the period from 9:40 to 9:50, user behavior data 44 of user A1 during the period from 9:30 to 9:40, and so on. The user behavior data 41 is the current user behavior data of user A1. The user behavior data 42, user behavior data 43 and user behavior data 44 are historical user behavior data of user A1.

At block 702, the electronic device extracts multiple first data eigenvalues of each piece of historical user behavior data under the preset multiple user behavior dimensions, and multiple second data eigenvalues of current user behavior data under multiple user behavior dimensions.

Specifically, in order to facilitate the electronic device to extract data eigenvalues of each piece of user behavior data under multiple user behavior dimensions, the user behavior dimensions may be divided into a business layer feature dimension and a behavior layer feature dimension. Through the business layer feature dimension and the behavior layer feature dimension, the electronic device can quickly extract data eigenvalues under multiple user behavior dimensions.

The electronic device obtains multiple user behavior dimensions by arbitrarily combining contents included in the business layer feature dimension and behavior level feature dimension. As shown in FIG. 3, in one example, the user behavior dimensions obtained by the electronic device include, but are not limited to, the number of messages sent by IM, the number of messages received by IM, the number of files sent by IM, the size of files sent by IM, and so on.

Then, under multiple user behavior dimensions, the electronic device extracts multiple first data eigenvalues of each of the multiple pieces of user behavior data, and multiple second data eigenvalues of current user behavior data in multiple pieces of user behavior data.

At block 703, the electronic device determines the first data eigenvector of each piece of historical user behavior data based on the multiple first data eigenvalues, and the second data eigenvector of the current user behavior data is determined based on the multiple second data eigenvalues.

For each of the multiple pieces of user behavior data, one historical user behavior data is illustrated as an example. The electronic device combines multiple first data eigenvalues for the historical user behavior data to obtain a first data eigenvector for this historical user behavior data.

For the current user behavior data in multiple pieces of user behavior data, the electronic device obtains a second data eigenvector for the current user behavior data by combining multiple second data eigenvalues of the current user behavior data.

Specifically, according to the example of the preceding operations, the electronic device obtains user behavior data 31 of user A1, user behavior data 32 of user A1 and user behavior data 33 of user A1.

The electronic device extracts from the user behavior data 31, the number of messages sent by IM which is 10, the number of messages received by IM which is 8, the number of files sent by IM which is 2, and the size of files sent by IM which is 500 KB.

The electronic device extracts from the user behavior data 32, the number of messages sent by IM which is 9, the number of messages received by IM which is 8, the number of files sent by IM which is 3, and the size of files sent by IM which is 490 KB.

The electronic device extracts from the user behavior data 33, the number of messages sent by IM which is 10, the number of messages received by IM which is 7, the number of files sent by IM which is 1, and the size of files sent by IM which is 600 KB.

In this case, the electronic device may determine that the data eigenvector 01 of user behavior data 31 is $\{10, 8, 2, 500\}$, the data eigenvector 02 of user behavior data 32 is $\{9, 8, 3, 490\}$, and the data eigenvector 03 of user behavior data 33 is $\{10, 7, 1, 600\}$. The data eigenvector 01 is the second data eigenvector, the data eigenvector 02 and the data eigenvector 03 are the first data eigenvector.

At block 704, the electronic device obtains multiple data classes by clustering the multiple first data eigenvectors and the second data eigenvectors through a preset clustering algorithm.

In the example of the present disclosure, the preset clustering algorithm may be K-means clustering algorithm, K-means Plus clustering algorithm, and so on. The electronic device clusters the multiple first data eigenvectors and second data eigenvectors by a preset clustering algorithm to obtain multiple data classes. Each data class includes at least one data eigenvector.

In one example, the preset clustering algorithm is a K-means clustering algorithm. The electronic device clusters the multiple first data eigenvectors and second data eigenvectors by a K-means clustering algorithm to obtain K initial data classes. K is a positive integer. The electronic device takes these K initial data classes as K data classes.

At block 705, the electronic device determines a first central vector of a first data class to which the second data eigenvector belongs.

In an example of the present disclosure, the electronic device determines, from a plurality of data classes, the first data class to which the second data eigenvector belongs, calculates the mean value of multiple data eigenvectors included in the first data class, and takes this mean value as the central vector of the first data class to determine whether the current user to be identified is an abnormal user. The central vector of the first data class is the first central vector.

According to the example of the preceding operations, the first data class includes data eigenvector 01, data eigenvector 02 and data eigenvector 03. The electronic device calculates the mean value $t_2$ of the data eigenvector 01, the data eigenvector 02 and the data eigenvector 03, and determines the calculated mean value $t_2$ as the first central vector of the first data class.

At block 706, the electronic device determines the distance between the second data eigenvector and the first central vector.

According to the example of the preceding operations, the data eigenvector 01 is the second data eigenvector, and the central vector of the first data class is $t_2$. The electronic device calculates the distance $d_{a1}$ between the data eigenvector 01 and the central vector $t_2$.

At block 707, if the distance is not within the preset distance range, the electronic device determines the user to be identified as an abnormal user.

The electronic device determines the distance between the second data eigenvector and the first central vector, and determines whether the determined distance is within a preset distance range. If so, the electronic device may determine that the second data eigenvector is the difference eigenvector and that the user characterized by the second data eigenvector is an abnormal user, that is to say, the user to be identified is an abnormal user.

A distance range is preset by the electronic device. In different data classes, the distribution of data eigenvectors is different. In order to improve the accuracy that the electronic device identifies abnormal users, a distance range of the first data class can be preset by the electronic device.

In an example of the present disclosure, for the distance between the second data eigenvector and the central vector of the first data class, if the electronic device determines that the distance is not within the preset distance range, the electronic device determines that the user to be identified is an abnormal user. If the distance is within the preset distance range, the electronic device determines that the user to be identified is a normal user.

According to the example of the preceding operations, the preset distance range is $d_{a01}$~$d_{a02}$. The electronic device calculates the distance $d_{a1}$ between the data eigenvector 01 and the central vector $t_2$. If $d_{a1}<d_{a01}$ or $d_{a1}>d_{a02}$, the electronic device may determine that the user to be identified, i.e., user A1, is an abnormal user.

In an example of the present disclosure, the electronic device obtains the first data class to which the current user behavior data class belongs by clustering the data eigenvectors. The electronic device may identify abnormal users based on the distance between the second data eigenvector of and the central vector of the first data class. An administrator does not need to add restricted user names to a blacklist, and an electronic device does not need to establish a blacklist to identify abnormal users. The abnormal user identification method according to the example of the present disclosure can identify abnormal users who are unknown to the administrator and whose abnormal behavior cannot be found by the administrator.

In one implementation, in order to avoid that too few data eigenvectors being included in a data class leads to an undesired clustering effect and inaccurate abnormal user identification, the electronic device stores a preset number threshold, which is used to limit the number of data eigenvectors included in a data class. The block 704 may include the following operations.

The electronic device obtains K initial data classes by clustering the multiple first data eigenvectors and second data eigenvectors by a K-means clustering algorithm.

The electronic device acquires a first initial data class in the K initial data classes. The first initial data class includes N data eigenvectors, where N is a positive integer. The first initial data class is an initial data class to which the second data eigenvector in the K initial data classes belongs.

The electronic device detects whether N is less than a number threshold. If N is not less than the number threshold, the electronic device takes these K initial data classes as the K data classes.

If N is less than the preset number threshold, the electronic device acquires a second initial data class in the K initial data classes. The second initial data class is an initial data class, in the K initial user classes, whose a central vector whose has a minimum distance from the central vector of the first initial user class is smallest.

Then, the electronic device combines the first initial data class and the second initial data class to obtain a combined initial data class.

The electronic device takes the combined initial data class as a clustered data class, and takes other initial data classes that are not combined in the K initial data classes as clustered data classes. Thus, the electronic device obtains multiple data classes.

In one implementation, in order to obtain a better clustering effect, the electronic device can combine the multiple data classes by calculating aggregate values of data eigenvectors. The aggregate value represents the reasonable degree that a data eigenvector belongs to a data class.

In one implementation, the electronic device may obtain the aggregate value by the following operations.

The electronic device calculates a first distance between the third data eigenvector and each fourth data eigenvector, respectively. The fourth data eigenvector is a data eigenvector included in a data class to which the third data eigenvector belongs except the third data eigenvector. The electronic device takes the mean value of the multiple first distances to obtain a first distance mean value.

The electronic device calculates a second distance between the third data eigenvector and each fifth data eigenvector. The fifth data eigenvector is a data eigenvector included in a data class except the data class to which the third data eigenvector belongs. The electronic device takes the mean value of multiple second distances for the same data class, so as to obtain multiple second distance mean values. The electronic device obtains the minimum distance mean value of the multiple second distance mean values.

Then, the electronic device obtains the aggregation value of the third data eigenvector by calculating the ratio of the first distance mean value to the minimum distance mean value.

The above is illustrated with the third data eigenvector as an example only and is not restrictive.

In an example, based on the aggregate values determined above, the process of combining the obtained multiple data classes by the electronic device may include the following operations.

The electronic device calculates the distance between the first central vector and the second central vector of any data class in the multiple data classes except the first data class to obtain multiple distances. That is, the electronic device calculates the distance between the first central vector and the second central vector, to obtain multiple distances, wherein the second central vector is a central vector of any data class in the multiple data classes except the first data class.

The electronic device acquires the minimum distance from the obtained distances, and determines the second data class characterized by the minimum distance.

The electronic device acquires a third aggregate value of a data eigenvector included in each of the multiple data classes. Here, the electronic device may obtain multiple third aggregate values.

In addition, when the electronic device takes the first data class and the second data class as a combined data class, that is, when the electronic device takes the first data class and the second data class as one data class, the electronic device acquires fourth aggregate values of the data eigenvectors included in the combined data class, and acquires a fourth aggregate value of a data eigenvector included in each data class in the multiple data classes except the combined data class. Here, the electronic device may obtain multiple fourth aggregate values.

The electronic device obtains a third sum value by performing a summation operation on the multiple aggregate values. The electronic device obtains a fourth sum value by performing a summation operation on the multiple aggregate values. Here, the sum value of the aggregate values of all data eigenvectors in multiple data classes are used to evaluate the clustering effect.

When the fourth sum value is less than the third sum value, the electronic device determines that combining the first data class and the second data class can achieve a better clustering effect, and thus combines the first data class and the second data class.

Then, the electronic device recalculates the distance between the central vector of the first data class and the central vector of any data class in the multiple data classes except the first data class, determines a second data class characterized by the minimum distance of the obtained multiple distances, and combines the first data class and the second data class until the fourth sum value is not less than the third sum value.

In an example, in order to achieve a better clustering effect, the electronic device may also obtain the aggregation value by the following operations.

For example, the process of determining the first distance mean value and the minimum distance mean value of the multiple second distance mean values by the electronic device is illustrated above. After calculating the ratio of the minimum distance mean value to the first distance mean value, the electronic device obtains the aggregation value of the third data eigenvector by subtracting 1 from this ratio.

In an example, in order to achieve a better clustering effect, the electronic device may also obtain the aggregation value by the following operations.

For example, the process of determining the first distance mean value and the minimum distance mean value of the multiple second distance mean values by the electronic device is illustrated above. After calculating the ratio of the first distance mean value to the minimum distance mean value, the electronic device obtains the aggregation value of the third data eigenvector by subtracting this ratio from 1.

In an example, based on the aggregation value obtained by subtracting the ratio from 1, or by subtracting 1 from the ratio, the process of combining the obtained multiple data classes by the electronic device may include the following operations.

The electronic device calculates the distance between the first central vector and the second central vector of any data class in the multiple data classes except the first data class, so as to obtain multiple distances. That is, the electronic device calculates the distance between the first central vector and the second central vector, to obtain multiple distances, wherein the second central vector is a central vector of any data class in the multiple data classes except the first data class.

The electronic device acquires the minimum distance from the obtained distances, and determines the second data class characterized by the minimum distance.

The electronic device acquires third aggregate values of the data eigenvectors included in each of the multiple data classes. Here, the electronic device may obtain multiple third aggregate values.

In addition, when the electronic device takes the first data class and the second data class as a combined data class, that is, when the electronic device takes the first data class and the second data class as one data class, the electronic device acquires fourth aggregate values of the data eigenvectors included in the combined data class, and acquires a fourth aggregate value of a data eigenvector included in each data class in the multiple data classes except the combined data class. Here, the electronic device may obtain multiple fourth aggregate values.

The electronic device obtains a third sum value by performing a summation operation on the multiple third aggregate values. The electronic device obtains a fourth sum value by performing a summation operation on the multiple third aggregate values.

When the fourth sum value is larger than the third sum value, the electronic device determines that combining the first data class and the second data class can a better clustering effect, and thus combines the first data class and the second data class.

Then, the electronic device recalculates the distance between the central vector of the first data class and the central vector of any data class in the multiple data classes except the first data class, determines a second data class characterized by the minimum distance of the obtained multiple distances, and combines the first data class and the second data class until the fourth sum value is not larger than the third sum value.

In an example, in order to improve the accuracy that the electronic device identifies abnormal users, the distance range of the first data class is pre-stored by the electronic device. The distance range limits the distance between a data eigenvector in a data class and the central vector of the data class.

In an implementation, an electronic device may determine the distance range of the first data class by the following operations.

The electronic device calculates the distance between the first central vector and each data eigenvector included in the first data class respectively, to obtain multiple distances.

The electronic device calculates the distance mean value of multiple distances as a third distance mean value. The electronic device also calculates the standard deviation of multiple distances as a first standard deviation. The electronic device may construct a normal distribution curve based on the third distance mean value and the first standard deviation. The normal distribution curve represents the distribution of the distance between the first central vector and the data eigenvector included in the first data class.

Based on the normal distribution curve, a first boundary value and a second boundary value is determined by the electronic device based on the third distance mean value and the first standard deviation. The first boundary value is less than the third distance mean value, and the absolute value of the difference between the first boundary value and the third distance mean value is a preset multiple of the first standard deviation. The second boundary value is larger than the third distance mean value, and the absolute value of the difference between the second boundary value and the third distance mean value is also a preset multiple of the first standard deviation.

The electronic device determines an interval from the first boundary value to the second boundary value as the distance range of the first data class.

In one example, the preset multiple is 3. In this case, the electronic device determines the distance range of the first data class based on three times the standard deviation as shown in FIG. 5. In FIG. 5, $\mu_1$ is the third distance mean value, s is the first standard deviation, and the distance range is $\mu_1-3s \sim \mu_1+3s$.

In the normal distribution curve, data whose distance from the third distance mean value $\mu_1$ is larger than three times the standard deviation belongs to a small probability event, which represents an event that cannot happen. If the distance between the second data eigenvector and the first central vector is not within the distance range, the electronic device may identify the user to be identified as an abnormal user.

However, in practical applications, the distribution of distances between the first central vector and data eigenvectors included in the first data class does not conform to the normal distribution curve. In another implementation, the electronic device may determine the distance range of the first data class by the following operations.

The electronic device calculates the distance between the first central vector and each data eigenvector included in the first data class respectively, to obtain multiple distances.

The electronic device calculates a logarithm value of each of the multiple distances based on a preset logarithmic function. The electronic device also calculates the mean value of the multiple logarithm values as a logarithmic mean value. The electronic device also calculates the standard deviation of the obtained multiple logarithm values as a second standard deviation. The electronic device may construct a normal distribution curve based on the logarithmic mean value and the second standard deviation. The normal distribution curve represents the logarithmic distribution of the distances between the first central vector and the data eigenvectors in the first data class.

Based on the normal distribution curve, a third boundary value and a fourth boundary value is determined by the electronic device based on the logarithmic mean value and the second standard deviation. The third boundary value is less than the logarithmic mean value, and the absolute value of the difference between the third boundary value and the logarithmic mean value is a preset multiple of the second standard deviation. The fourth boundary value is larger than the logarithmic mean value, and the absolute value of the difference between the second boundary value and the logarithmic mean value is also a preset multiple of the second standard deviation.

The electronic device calculates, based on the inverse function of the preset logarithmic function, an antilogarithm value of the third boundary value as a first antilogarithm value and an antilogarithm value of the fourth boundary value as a second antilogarithm value. For example, if the preset logarithmic function is $y=\log_{10}x$, the inverse function of the preset logarithmic function is $x=10^y$.

The electronic device determines an interval from the first antilogarithm value and the second antilogarithm value as the distance range of the first data class.

In one implementation, in order to improve the accuracy that the electronic device identifies abnormal users, the electronic device determines whether a data eigenvalue for a second data eigenvector exceeds a preset baseline eigenvalue based on each of the multiple user behavior dimensions. In one example, the electronic device presets one baseline eigenvalue for each user behavioral dimension. Here, the second data eigenvector is the difference eigenvector.

If a data eigenvalue for the second data eigenvector exceeds the baseline eigenvalue, the electronic device may determine that user behavior characterized under the user behavior dimension is an abnormal user behavior, and that the user to be identified is an abnormal user.

If a data eigenvalue for the second data eigenvector does not exceed the baseline eigenvalue, the electronic device may determine that a user behavior characterized under the user behavior dimension is a normal user behavior. If all the data eigenvalues for the second data eigenvectors do not exceed the baseline eigenvalue, the electronic device determines that the user to be identified is a normal user.

In an example of the present disclosure, for a data behavior dimension with a small difference in user eigenvalue, for example, user behavior dimension 1, the electronic device may directly determine the baseline eigenvalue for the user behavior dimension 1. For example, a frequency of a user switching MAC addresses is usually 1 or 2 times a day. In this case, the electronic device may determine that the baseline eigenvalue for a user behavior dimension, i.e., the frequency of switching MAC addresses, is 2.

For a data behavior dimension with a large difference in user eigenvalue, for example, user behavior dimension 2, the probability density distribution of data eigenvalues for multiple pieces of user behavior data under the user behavior dimension 2 is calculated by the electronic device. Based on the probability density distribution, the electronic device determines the baseline eigenvalue for the user behavior dimension 2.

Figure 8:
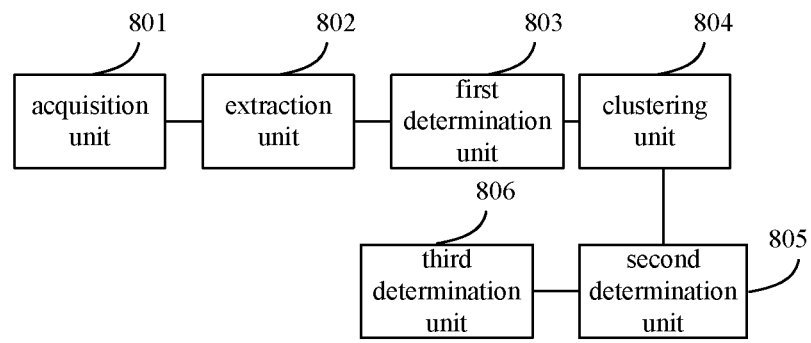
FIG. 8 is a schematic structural diagram of an abnormal user identification apparatus according to an example of the present disclosure.

Based on the same inventive concept, based on the above-mentioned abnormal user identification method, an example of the present disclosure further provides an abnormal user identification apparatus. Referring to FIG. 8, a first schematic structural diagram of an abnormal user identification apparatus according to an example of the present disclosure is shown. The apparatus includes an acquisition unit 801, an extraction unit 802, a first determination unit 803, a clustering unit 804, a second determination unit 805 and a third determination unit 806.

The acquisition unit 801 is to acquire user behavior data of a user;

The extraction unit 802 is to extract multiple eigenvalues of the user behavior data under preset multiple behavior dimensions;

The first determination unit 803 is to determine eigenvectors for the user behavior data based on the multiple eigenvalues;

the clustering unit 804 is to obtain multiple aggregation classes by clustering the eigenvectors through a preset clustering algorithm, and acquire a central vector of each aggregation class;

the second determination unit 805 is to determine a difference eigenvector, wherein a distance between the difference eigenvector and a central vector of an aggregation class to which the difference eigenvector belongs is not within a preset distance range;

the third determination unit 806 is to determine a user characterized by the difference eigenvector as an abnormal user.

In the abnormal user identification apparatus according to an example of the present disclosure, the electronic device clusters eigenvectors to acquire a difference eigenvector whose distance from a central vector of an aggregation class is not within a preset distance range. The electronic device realizes the identification of abnormal users based on the acquired difference eigenvector. An administrator does not need to add restricted user names to a blacklist, and an electronic device does not need to establish a blacklist to identify abnormal users, realizing the identification of users who are unknown to the administrator and whose abnormal behaviors cannot be found by the administrator.

In an example, the user may include multiple users.

In this case, the acquisition unit 801 may be specifically to acquire user behavior data of the multiple users.

The extraction unit 802 may be specifically to extract multiple user eigenvalues of user behavior data of each of the multiple users under preset multiple user behavior dimensions.

The first determination unit 803 may be specifically to determine a user eigenvector of each of the multiple users based on multiple user eigenvalues of this user.

The clustering unit 804 may be specifically to obtain multiple user classes by clustering the user eigenvectors of the multiple users by a preset clustering algorithm and determine a central vector of each of the multiple user classes based on a user eigenvector contained in this user class.

In an example, the clustering unit 804 may be specifically to:

obtain K initial user classes by clustering the user eigenvectors of the multiple users through a K-means clustering algorithm, wherein K is a positive integer;

acquire a first initial user class and a second initial user class in the K initial user classes;

obtain a combined initial user class by combining the first initial user class and the second initial user class;

obtain multiple user classes by taking the combined initial user class and other initial user classes that are not combined in the K initial user classes respectively as clustered user classes;

wherein, the first initial user class is an initial user class, in the K initial user classes, in which the number of user eigenvectors is less than a preset number threshold;

the second initial user class is an initial user class in the K initial user classes, wherein the distance between a central vector of this initial user class and a central vector of the first initial user class is minimum.

In an example, the clustering unit 804 may be further to:

obtain multiple distances by calculating a distance between central vectors of any two user classes in the multiple user classes;

determine a first user class and a second user class characterized by a minimum distance of the multiple distances;

acquire a first aggregate value of a user eigenvector contained in each of the multiple user classes;

when the first user class and the second user class are taken as a combined user class, acquire second aggregate values of user eigenvectors contained in the combined user class, and acquire a second aggregate value of a user eigenvector contained in each user class in the multiple user classes except the combined user class;

obtain a first sum value by performing a summation operation on the multiple first aggregate values;

obtain a second sum value by performing a summation operation on the multiple second aggregate values;

when the second sum value is less than the first sum value, combining the first user class and the second user class;

wherein the aggregate value represents a reasonable degree that a user eigenvector belongs to a user class.

In an example, the clustering unit 804 may be further to:

calculate a first distance between the first user eigenvector and each second user eigenvector, wherein the second user eigenvector is a user eigenvector in a user class to which the first user eigenvector belongs except the first user eigenvector;

calculate a second distance between the first user eigenvector and each third user eigenvector, wherein the third user eigenvector is a user eigenvector in a user class except the user class to which the first user eigenvector belongs;

obtain a first distance mean value by taking a mean value of the multiple first distances;

obtain multiple second distance mean values by taking a mean value of multiple second distances for the same user class;

obtain the minimum distance mean value of the multiple second distance mean values;

take the ratio of the first distance mean value to the minimum distance mean value, as the aggregation value of the first user eigenvector.

In an example, the third determination unit 806 may be specifically to:

determine whether a data eigenvalue for the difference eigenvector exceeds a preset baseline eigenvalue based on each of the multiple user behavior dimensions; and if the data eigenvalue exceeds the preset baseline eigenvalue, determine that a user behavior characterized under the user behavior dimension is an abnormal user behavior, and that a user characterized by the difference eigenvector is an abnormal user.

In an example, when the user includes one user, the user behavior data may include at least one piece of historical user behavior data and one piece of current user behavior data.

In this case, the acquisition unit 801 may be specifically to acquire multiple pieces of user behavior data of a user to be identified, wherein, the multiple pieces of user behavior data include at least one piece of historical user behavior data and one piece of current user behavior data.

The extraction unit 802 may be specifically to extract multiple first data eigenvalues of each of the at least one piece of historical user behavior data under preset multiple behavior dimensions, and multiple second data eigenvalues of the current user behavior data under the multiple behavior dimensions.

The first determination unit 803 may be specifically to determine a first data eigenvector of each of the at least piece of historical user behavior data based on the multiple first data eigenvalues, and a second data eigenvector of the current user behavior data based on the multiple second data eigenvalues.

The clustering unit 804 may be specifically to obtain multiple data classes by clustering the multiple first data eigenvectors and the second data eigenvector through a preset clustering algorithm and determine a central vector of a first data class to which the second data eigenvector belongs.

The second determination unit 805 may be specifically to determine whether a distance between the second data eigenvector and the central vector of the first data class is within a preset distance range; and if the distance is not within the preset distance range, determine the second data eigenvector as a difference eigenvector.

In an example, the clustering unit 804 may be specifically to:

obtain K initial data classes by clustering the multiple first data eigenvectors and the second data eigenvector by a K-means clustering algorithm, wherein K is a positive integer;

acquire a first initial data class in the K initial data classes, wherein, the first initial data class contains N data eigenvectors, and N is a positive integer;

if N is less than a preset number threshold, acquire a second initial data class in the K initial data classes;

obtain a combined initial data class by combining the first initial data class and the second initial data class;

obtain multiple data classes by taking the combined initial data class and other initial data classes that are not combined in the K initial data classes respectively as clustered user classes;

wherein, the first initial data class is an initial data class to which the second data eigenvector belongs;

the second initial data class is an initial data class, in the K initial user classes, whose central vector has a minimum distance from a central vector of the first initial user class.

In an example, the clustering unit 804 may be further to:

obtain multiple distances by calculating a distance between a first central vector of the first data class and a second central vector, which is a central vector of any data class in the multiple data classes except the first data class;

determine a second data class characterized by the minimum distance of the multiple distances;

acquire a third aggregate value of a data eigenvector contained in each of the multiple data classes.

when the first data class and the second data class are taken as a combined data class, acquire fourth aggregate values of data eigenvectors contained in the combined data class, and acquire a fourth aggregate value of a data eigenvector contained in each data class in the multiple data classes except the combined data class;

obtain a third sum value by performing a summation operation on the multiple third aggregate values;

obtain a fourth sum value by performing a summation operation on the multiple fourth aggregate values;

when the fourth sum value is less than the third sum value, combine the first data class and the second data class;

wherein the aggregate value represents a reasonable degree that a data eigenvector belongs to a data class.

In an example, the clustering unit 804 may be further to:

calculate a first distance between the third data eigenvector and each fourth data eigenvector, wherein, the fourth data eigenvector is a data eigenvector included in a data class to which the third data eigenvector belongs except the third data eigenvector;

calculate a second distance between the third data eigenvector and each fifth data eigenvector, wherein, the fifth data eigenvector is a data eigenvector included in each data class except the data class to which the third data eigenvector belongs;

obtain a first distance mean value by taking the mean value of the multiple first distances;

obtain multiple second distance mean values by taking the mean value of the multiple second distances for the same user class;

obtain the minimum distance mean value of the multiple second distance mean values;

take the ratio of the first distance mean value to the minimum distance mean value, as the aggregation value of the third data eigenvector.

In an example, the third determination unit 806 may be specifically to:

determine whether a data eigenvalue for a second data eigenvector exceeds a preset baseline eigenvalue based on each of the multiple user behavior dimensions, wherein the second data eigenvector is the difference eigenvector;

if the data eigenvalue for the second data eigenvector exceeds the baseline eigenvalue, determine that a user behavior characterized under the user behavior dimension is an abnormal user behavior, and that the user to be identified is an abnormal user.

Figure 9:
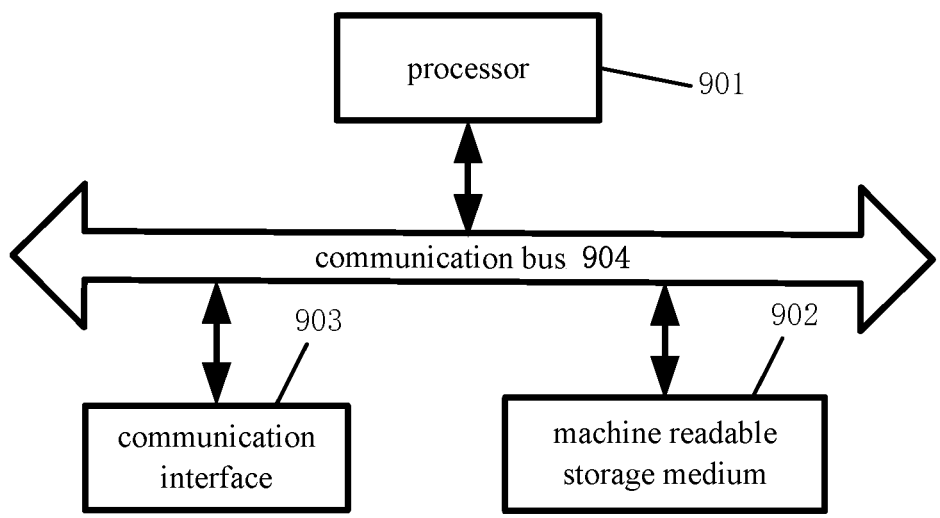
FIG. 9 is a schematic structural diagram of an electronic device according to an example of the present disclosure.

Based on the same inventive concept, according to the above abnormal user identification method, an example of the present disclosure further provides an electronic device, as shown in FIG. 9, including a processor 901 and a machine readable storage medium 902, which stores machine executable instructions that can be executed by processor 901. The machine executable instructions cause the processor 901 to:

acquire user behavior data of a user;

extract multiple eigenvalues of the user behavior data under preset multiple behavior dimensions;

determine eigenvectors for the user behavior data based on the multiple eigenvalues;

obtain multiple aggregation classes by clustering the eigenvectors through a preset clustering algorithm, and acquire a central vector of each aggregation class;

determine a difference eigenvector, wherein a distance between the difference eigenvector and a central vector of an aggregation class to which the difference eigenvector belongs is not within a preset distance range; and determine a user characterized by the difference eigenvector as an abnormal user.

In the electronic device according to an example of the present disclosure, the electronic device clusters eigenvectors to acquire a difference eigenvector whose distance from the central vector of an aggregation class is not within a preset distance range. The electronic device realizes the identification of abnormal users based on the acquired difference eigenvector. An administrator does not need to add restricted user names to a blacklist, and an electronic device does not need to establish a blacklist to identify abnormal users, realizing the identification of users who are unknown to the administrator and whose abnormal behaviors cannot be found by the administrator.

In an example, when the user includes multiple users, the machine executable instructions may specifically cause the processor 901 to:

extract multiple user eigenvalues of user behavior data of each of the multiple users under multiple user behavior dimensions;

determine a user eigenvector of each of the multiple users based on multiple user eigenvalues of this user;

obtain multiple user classes by clustering the user eigenvectors of the multiple users through a preset clustering algorithm; and determine a central vector of each of the multiple user classes based on a user eigenvector contained in this user class.

In an example, the machine executable instructions may specifically cause the processor 901 to:

obtain K initial user classes by clustering the user eigenvectors of the multiple users through a K-means clustering algorithm, wherein K is a positive integer;

acquire a first initial user class and a second initial user class in the K initial user classes;

obtain a combined initial user class by combining the first initial user class and the second initial user class;

obtain multiple user classes by taking the combined initial user class and other initial user classes that are not combined in the K initial user classes respectively as clustered user classes;

wherein, the first initial user class is an initial user class, in the K initial user classes, in which the number of user eigenvectors is less than a preset number threshold;

the second initial user class is an initial user class in the K initial user classes, wherein the distance between a central vector of this initial user class and a central vector of the first initial user class is minimum.

In an example, the machine executable instructions may further cause the processor 901 to:

obtain multiple distances by calculating a distance between the central vectors of any two user classes in the multiple user classes;

determine a first user class and a second user class characterized by a minimum distance of the multiple distances;

acquire a first aggregate value of a user eigenvector included in each of the multiple user classes;

when the first user class and the second user class are taken as a combined user class, acquire second aggregate values of user eigenvectors included in the combined user class, and acquire a second aggregate value of a user eigenvector included in each user class in the multiple user classes except the combined user class;

obtain a first sum value by performing a summation operation on the first multiple aggregate values;

obtain a second sum value by performing a summation operation on the second multiple aggregate values;

when the second sum value is less than the first sum value, combine the first user class and the second user class;

wherein, the aggregate value represents a reasonable degree that a user eigenvector belongs to a user class.

In an example, the machine executable instructions may further cause the processor 901 to:

calculate a first distance between the first user eigenvector and each second user eigenvector, wherein the second user eigenvector is a user eigenvector in a user class to which the first user eigenvector belongs except the first user eigenvector;

calculate a second distance between the first user eigenvector and each third user eigenvector, wherein the third user eigenvector is a user eigenvector in a user class except the user class to which the first user eigenvector belongs;

obtain a first distance mean value by taking the mean value of the multiple first distances;

obtain multiple second distance mean values by taking the mean value of multiple second distances for the same user class;

obtain the minimum distance mean value of the multiple second distance mean values;

take the ratio of the first distance mean value to the minimum distance mean value, as the aggregation value of the first user eigenvector.

In an example, the machine executable instructions may specifically cause the processor 901 to:

determining whether a user eigenvalue for the difference eigenvector exceeds a preset baseline eigenvalue based on each of the multiple user behavior dimensions;

if the user eigenvalue for the difference eigenvector exceeds the baseline eigenvalue, it is determined that a user behavior characterized under the user behavior dimension is an abnormal user behavior, and that a user characterized by the difference eigenvector is an abnormal user.

In an example, when the user includes one user, the user behavior data includes at least one piece of historical user behavior data and one piece of current user behavior data.

The machine executable instructions may specifically cause the processor 901 to:

extract multiple first data eigenvalues of each of the at least one piece of historical user behavior data under the multiple behavior dimensions, and multiple second data eigenvalues of the current user behavior data under the multiple behavior dimensions;

determine a first data eigenvector of each piece of historical user behavior data based on the multiple first data eigenvalues, and a second data eigenvector of the current user behavior data based on the multiple second data eigenvalues;

obtain multiple data classes by clustering the multiple first data eigenvectors and the second data eigenvector by a preset clustering algorithm;

determine a central vector of a first data class to which the second data eigenvector belongs;

determine whether a distance between the second data eigenvector and the central vector of the first data class is within a preset distance range;

if the distance is not within the preset distance range, determine the second data eigenvector as a difference eigenvector.

In an example, the machine executable instructions may specifically cause the processor 901 to:

obtain K initial data classes by clustering the multiple first data eigenvectors and the second data eigenvector by a K-means clustering algorithm, wherein K is a positive integer;

acquire a first initial data class in the K initial data classes, wherein, the first initial data class contains N data eigenvectors, and N is a positive integer;

if N is less than a preset number threshold, acquire a second initial data class in the K initial data classes;

obtain a combined initial data class by combining the first initial data class and the second initial data class;

obtain multiple data classes by taking the combined initial data class and other initial data classes that are not combined in the K initial data classes respectively as clustered data classes;

wherein, the first initial data class is an initial data class to which the second data eigenvector belongs;

the second initial data class is an initial data class, in the K initial user classes, whose central vector has a minimum distance from a central vector of the first initial user class.

In an example, the machine executable instructions may further cause the processor 901 to:

obtain multiple distances by calculating a distance between a first central vector of the first data class and a second central vector, which is a central vector of any data class in multiple data classes except the first data class;

determine a second data class characterized by the minimum distance of the multiple distances;

acquire a third aggregate value of a data eigenvector included in each of the multiple data classes.

when the first data class and the second data class are taken as a combined data class, acquire fourth aggregate values of data eigenvectors included in the combined data class, and acquire a fourth aggregate value of a data eigenvector included in each data class in the multiple data classes except the combined data class;

obtain a third sum value by performing a summation operation on multiple third aggregate values;

obtain a fourth sum value by performing a summation operation on multiple fourth aggregate values;

when the fourth sum value is less than the third sum value, combine the first data class and the second data class;

wherein, the aggregate value represents a reasonable degree that a data eigenvector belongs to a data class.

In an example, the machine executable instructions may further cause the processor 901 to:

calculate a first distance between the third data eigenvector and each fourth data eigenvector, wherein, the fourth data eigenvector is a data eigenvector included in a data class to which the third data eigenvector belongs except the third data eigenvector;

calculate a second distance between the third data eigenvector and each fifth data eigenvector, wherein, the fifth data eigenvector is a data eigenvector included in each data class except the data class to which the third data eigenvector belongs;

obtain a first distance mean value by taking the mean value of multiple first distances;

obtain multiple second distance mean values by taking the mean value of multiple second distances for the same user class;

obtain the minimum distance mean value of the multiple second distance mean values;

take the ratio of the first distance mean value to the minimum distance mean value, as the aggregation value of the third data eigenvector.

In an example, the machine executable instructions may specifically cause the processor 901 to:

determine whether a data eigenvalue for the second data eigenvector exceeds a preset baseline eigenvalue based on each of the multiple user behavior dimensions, wherein the second data eigenvector is the difference eigenvector;

if the data eigenvalue for the second data eigenvector exceeds the baseline eigenvalue, determine that a user behavior characterized under the user behavior dimension is an abnormal user behavior, and that the user to be identified is an abnormal user.

In addition, as shown in FIG. 9, the electronic device may further include a communication interface 903 and a communication bus 904. The processor 901, the machine readable storage medium 902 and the communication interface 903 communicate with each other through the communication bus 904, and the communication interface 903 is used for communication between the above electronic device and other devices.

The above communication bus may be a peripheral component interconnection (PCI) bus or an extended industry standard architecture (EISA) bus. The communication bus may be divided into an address bus, a data bus, a control bus and the like.

The machine readable storage medium mentioned above may include a random access memory (RAM) or a non-volatile memory (NVM), such as at least one disk memory. In addition, the machine readable storage medium may also be at least one storage device located away from the aforementioned processor.

The processor may be a general purpose processor, including a central processing unit (CPU), a network processor (NP) and so on. The processor may further be a digital signal processor (DSP), an application specific integrated circuit (ASIC), a field-programmable gate array (FPGA), or another programmable logic device, a discrete gate or a transistor logic device, a discrete hardware component.

Based on the same inventive concept, according to the above abnormal user identification method, an example of the present disclosure further provides a machine readable storage medium that stores machine executable instructions that, when called and executed by a processor, cause the processor to perform any abnormal user identification method shown in FIGS. 1-7 above.

Based on the same inventive concept, according to the above abnormal user identification method, an example of the present disclosure further provides a machine executable instruction that, when called and executed by a processor, causes the processor to perform any abnormal user identification method shown in FIGS. 1-7 above.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All of the examples in the description are described in a correlated manner, and identical or similar parts in various embodiments can refer to one another. In addition, the description for each example focuses on the differences from other examples. In particular, the example of the abnormal user identification apparatus, electronic device, machine readable storage medium is described briefly, since it is substantially similar to the example of the method, and the related contents can refer to the description of the example of the method.

The examples described above are just preferable examples of the present disclosure, and not indented to limit the protection scope of the present disclosure. Any modifications, alternatives, improvements or the like within the spirit and principle of the present disclosure shall be included in the protection scope of the present disclosure.

The invention claimed is:

1. An abnormal user identification method, comprising:
acquiring user behavior data of a user;
extracting multiple eigenvalues of the user behavior data under preset multiple behavior dimensions, wherein the preset multiple behavior dimensions are obtained by arbitrarily combining content included in a business layer feature dimension and a behavior layer feature dimension;
determining eigenvectors for the user behavior data based on the multiple eigenvalues;
obtaining multiple aggregation classes by clustering the eigenvectors through a preset clustering algorithm, and acquiring a central vector of each of the multiple aggregation classes;

determining a difference eigenvector, wherein a distance between the difference eigenvector and a central vector of one of the multiple aggregation classes to which the difference eigenvector belongs is not within a preset distance range; and determining a user characterized by the difference eigenvector as an abnormal user, wherein when the user includes multiple users, extracting the multiple eigenvalues of the user behavior data under the preset multiple behavior dimensions comprises:

extracting multiple user eigenvalues of user behavior data of each user of the multiple users under multiple user behavior dimensions;

determining the eigenvectors for the user behavior data based on the multiple eigenvalues comprises:

determining a user eigenvector of each of the multiple users based on multiple user eigenvalues of the each of the multiple users;

obtaining the multiple aggregation classes by clustering the eigenvectors through the preset clustering algorithm and acquiring the central vector of each of the multiple aggregation classes, comprises:

obtaining multiple user classes by clustering the user eigenvectors of the multiple users through the preset clustering algorithm; and determining a central vector of each of the multiple user classes based on a user eigenvector contained in this user class, wherein, obtaining the multiple user classes by clustering the user eigenvectors of the multiple users through the preset clustering algorithm, comprises:

obtaining K initial user classes by clustering the user eigenvectors of the multiple users through a K-means clustering algorithm, wherein K is a positive integer;

acquiring a first initial user class and a second initial user class in the K initial user classes;

obtaining a combined initial user class by combining the first initial user class and the second initial user class;

obtaining the multiple user classes by taking the combined initial user class and other initial user classes that are not combined in the K initial user classes respectively as clustered user classes;

wherein, the first initial user class is an initial user class, in the K initial user classes, in which the number of user eigenvectors is less than a preset number threshold;

the second initial user class is an initial user class in the K initial user classes, wherein the distance between a central vector of the second initial user class and a central vector of the first initial user class is minimum, wherein the method further comprising:

obtaining multiple distances by calculating a distance between central vectors of any two user classes in the multiple user classes;

determining a first user class and a second user class characterized by a minimum distance of the multiple distances;

acquiring a first aggregate value of a user eigenvector contained in each of the multiple user classes;

when the first user class and the second user class are taken as a combined user class, acquiring second aggregate values of user eigenvectors contained in the combined user class, and acquiring a second aggregate value of a user eigenvector contained in each user class in the multiple user classes except the combined user class;

obtaining a first sum value by performing a summation operation on the multiple first aggregate values;

obtaining a second sum value by performing the summation operation on the multiple second aggregate values;

when the second sum value is less than the first sum value, combining the first user class and the second user class;

wherein the first aggregate value and the second aggregate value represents a reasonable degree that a user eigenvector belongs to a user class.

2. The method of claim 1, when the user includes one user, the user behavior data contains at least one piece of historical user behavior data and one piece of current user behavior data;

extracting the multiple eigenvalues of the user behavior data under the preset multiple behavior dimensions comprises:

extracting multiple first data eigenvalues of each piece of the historical user behavior data under the multiple user behavior dimensions, and multiple second data eigenvalues of the current user behavior data under the multiple user behavior dimensions;

determining the eigenvectors for the user behavior data based on the multiple eigenvalues comprises:

determining a first data eigenvector of each piece of the historical user behavior data based on the multiple first data eigenvalues, and a second data eigenvector of the current user behavior data based on the multiple second data eigenvalues;

obtaining the multiple aggregation classes by clustering the eigenvectors through the preset clustering algorithm and acquiring the central vector of each of the multiple aggregation classes, comprises:

obtaining multiple data classes by clustering multiple first data eigenvectors and the second data eigenvector through the preset clustering algorithm; and determining a central vector of a first data class to which the second data eigenvector belongs;

determining the difference eigenvector, comprises:

determining whether a distance between the second data eigenvector and the central vector of the first data class is within a preset distance range; and if the distance between the second data eigenvector and the central vector of the first data class is not within the preset distance range, determining the second data eigenvector as the difference eigenvector.

3. The method of claim 2, wherein, obtaining the multiple data classes by clustering the multiple first data eigenvectors and the second data eigenvector through the preset clustering algorithm, comprises:

obtaining K initial data classes by clustering the multiple first data eigenvectors and the second data eigenvector through a K-means clustering algorithm, wherein K is a positive integer;

acquiring a first initial data class in the K initial data classes, wherein, the first initial data class contains N data eigenvectors, and N is a positive integer;

if N is less than a preset number threshold, acquiring a second initial data class in the K initial data classes;

obtaining a combined initial data class by combining the first initial data class and the second initial data class;

obtaining the multiple data classes by taking the combined initial data class and other initial data classes that are not combined in the K initial data classes respectively as clustered data classes;

wherein, the first initial data class is an initial data class to which the second data eigenvector belongs;

the second initial data class is an initial data class in the K initial data classes, wherein the distance between a central vector of the second initial data class and a central vector of the first initial user class is minimum.

4. The method of claim 3, wherein the method further comprises:
obtain multiple distances by calculating a distance between a first central vector of the first data class and a second central vector, which is a central vector of any data class in the multiple data classes except the first data class;
determining a second data class characterized by the minimum distance of the multiple distances;
acquiring a third aggregate value of a data eigenvector contained in each of the multiple data classes;
when the first data class and the second data class are taken as a combined data class, acquiring fourth aggregate values of data eigenvectors contained in the combined data class, and acquiring a fourth aggregate value of the data eigenvector contained in each data class in the multiple data classes except the combined data class;
obtaining a third sum value by performing a summation operation on the multiple third aggregate values;
obtaining a fourth sum value by performing the summation operation on the multiple fourth aggregate values;
when the fourth sum value is less than the third sum value, combining the first data class and the second data class;
wherein the third aggregate value and the fourth aggregate value represents a reasonable degree that a data eigenvector belongs to a data class.

5. The method of claim 1, determining the user characterized by the difference eigenvector as the abnormal user comprises:
determining whether a data eigenvalue for the difference eigenvector exceeds a preset baseline eigenvalue based on each of the multiple user behavior dimensions; and
if the data eigenvalue for the difference eigenvector exceeds the preset baseline eigenvalue, determining that a user behavior characterized under the user behavior dimension is the abnormal user behavior, and that a user characterized by the difference eigenvector is the abnormal user.

6. The method of claim 2, determining the user characterized by the difference eigenvector as the abnormal user comprises:
determining whether a data eigenvalue for the difference eigenvector exceeds a preset baseline eigenvalue based on each of the multiple user behavior dimensions; and
if the data eigenvalue for the difference eigenvector exceeds the preset baseline eigenvalue, determining that a user behavior characterized under the user behavior dimension is the abnormal user behavior, and that a user characterized by the difference eigenvector is the abnormal user.

7. A non-transitory machine readable storage medium, which stores machine executable instructions that, when called and executed by a processor, cause the processor to perform the method of claim 1.

8. An electronic device, comprising a processor and a non-transitory machine readable storage medium which stores machine executable instructions that can be executed by the processor, wherein, the machine executable instructions cause the processor to:
acquire user behavior data of a user;
extract multiple eigenvalues of the user behavior data under preset multiple behavior dimensions;
determine eigenvectors for the user behavior data based on the multiple eigenvalues;
obtain multiple aggregation classes by clustering the eigenvectors through a preset clustering algorithm, and acquire a central vector of each of the multiple aggregation classes;
determine a difference eigenvector, wherein a distance between the difference eigenvector and a central vector of one of the multiple aggregation classes to which the difference eigenvector belongs is not within a preset distance range; and
determine a user characterized by the difference eigenvector as an abnormal user,
wherein when the user includes multiple users, the machine executable instructions cause the processor to:
extract multiple user eigenvalues of user behavior data of each user of the multiple users under multiple user behavior dimensions;
determine a user eigenvector of each of the multiple users based on multiple user eigenvalues of the each of the multiple users;
obtain multiple user classes by clustering the user eigenvectors of the multiple users through the preset clustering algorithm; and
determine a central vector of each of the multiple user classes based on a user eigenvector contained in this user class,
wherein, the machine executable instructions cause the processor to:
obtain K initial user classes by clustering the user eigenvectors of the multiple users through a K-means clustering algorithm, wherein K is a positive integer;
acquire a first initial user class and a second initial user class in the K initial user classes;
obtain a combined initial user class by combining the first initial user class and the second initial user class;
obtain the multiple user classes by taking the combined initial user class and other initial user classes that are not combined in the K initial user classes respectively as clustered user classes;
wherein, the first initial user class is an initial user class, in the K initial user classes, in which the number of user eigenvectors is less than a preset number threshold;
the second initial user class is an initial user class in the K initial user classes, wherein the distance between a central vector of the second initial user class and a central vector of the first initial user class is minimum,
wherein, the machine executable instructions further cause the processor to:
obtain multiple distances by calculating a distance between central vectors of any two user classes in the multiple user classes;
determine a first user class and a second user class characterized by a minimum distance of the multiple distances;
acquire a first aggregate value of a user eigenvector contained in each of the multiple user classes;
when the first user class and the second user class are taken as a combined user class, acquire second aggregate values of user eigenvectors contained in the combined user class, and acquire a second aggregate value of a user eigenvector contained in each user class in the multiple user classes except the combined user class;
obtain a first sum value by performing a summation operation on the multiple first aggregate values;
obtain a second sum value by performing the summation operation on the multiple second aggregate values;

when the second sum value is less than the first sum value, combine the first user class and the second user class;

wherein the first aggregate value and the second aggregate value represents a reasonable degree that a user eigenvector belongs to a user class.

9. The electronic device of claim 8, when the user includes one user, the user behavior data contains at least one piece of historical user behavior data and one piece of current user behavior data;

the machine executable instructions cause the processor to:

extract multiple first data eigenvalues of each piece of the historical user behavior data under the multiple user behavior dimensions, and multiple second data eigenvalues of the current user behavior data under the multiple user behavior dimensions;

determine a first data eigenvector of each piece of the historical user behavior data based on the multiple first data eigenvalues, and a second data eigenvector of the current user behavior data based on the multiple second data eigenvalues;

obtain multiple data classes by clustering multiple first data eigenvectors and the second data eigenvector through the preset clustering algorithm;

determine a central vector of a first data class to which the second data eigenvector belongs;

determine whether a distance between the second data eigenvector and the central vector of the first data class is within a preset distance range;

if the distance between the second data eigenvector and the central vector of the first data class is not within the preset distance range, determine the second data eigenvector as the difference eigenvector.

10. The electronic device of claim 9, wherein, the machine executable instructions cause the processor to:

obtain K initial data classes by clustering the multiple first data eigenvectors and the second data eigenvector through a K-means clustering algorithm, wherein K is a positive integer;

acquire a first initial data class in the K initial data classes, wherein, the first initial data class contains N data eigenvectors, and N is a positive integer;

if N is less than a preset number threshold, acquire a second initial data class in the K initial data classes;

obtain a combined initial data class by combining the first initial data class and the second initial data class;

obtain the multiple data classes by taking the combined initial data class and other initial data classes that are not combined in the K initial data classes respectively as clustered data classes;

wherein, the first initial data class is an initial data class to which the second data eigenvector belongs;

the second initial data class is an initial data class, in the K initial user classes, whose central vector has a minimum distance from a central vector of the first initial user class.

11. The electronic device of claim 8, wherein, the machine executable instructions cause the processor to:

determine whether a data eigenvalue for the difference eigenvector exceeds a preset baseline eigenvalue based on each of the multiple user behavior dimensions; and if the data eigenvalue for the difference eigenvector exceeds the preset baseline eigenvalue, determine that a user behavior characterized under the user behavior dimension is the abnormal user behavior, and that a user characterized by the difference eigenvector is the abnormal user.

12. The electronic device of claim 9, wherein, the machine executable instructions cause the processor to:

determine whether a data eigenvalue for the difference eigenvector exceeds a preset baseline eigenvalue based on each of the multiple user behavior dimensions; and if the data eigenvalue for the difference eigenvector exceeds the preset baseline eigenvalue, determine that a user behavior characterized under the user behavior dimension is the abnormal user behavior, and that a user characterized by the difference eigenvector is the abnormal user.

* * * * *